US011843847B2

United States Patent
Aramaki

(10) Patent No.: US 11,843,847 B2
(45) Date of Patent: Dec. 12, 2023

(54) DEVICE, INFORMATION PROCESSING APPARATUS, CONTROL METHOD THEREFOR, AND COMPUTER-READABLE STORAGE MEDIUM

(71) Applicant: CANON KABUSHIKI KAISHA, Tokyo (JP)

(72) Inventor: Yuji Aramaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 219 days.

(21) Appl. No.: 17/445,103

(22) Filed: Aug. 16, 2021

(65) Prior Publication Data

US 2022/0070408 A1    Mar. 3, 2022

(30) Foreign Application Priority Data

Aug. 27, 2020 (JP) ................... 2020-143838
Apr. 23, 2021 (JP) ................... 2021-073658

(51) Int. Cl.
*H04N 23/611* (2023.01)
*H04N 23/57* (2023.01)
(Continued)

(52) U.S. Cl.
CPC ....... *H04N 23/611* (2023.01); *H04N 1/00339* (2013.01); *H04N 23/57* (2023.01); *H04N 23/661* (2023.01); *H04N 23/635* (2023.01); *H04N 2201/001* (2013.01); *H04N 2201/0013* (2013.01); *H04N 2201/0031* (2013.01);
(Continued)

(58) Field of Classification Search
CPC .. H04N 1/00339; H04N 23/61; H04N 23/611; H04N 2201/001; H04N 2201/0013; H04N 2201/0031; H04N 2201/0051; H04N 2201/0084
See application file for complete search history.

(56) References Cited

U.S. PATENT DOCUMENTS

| | | | | |
|---|---|---|---|---|
| 2003/0193571 | A1* | 10/2003 | Schultz | H04N 23/617 348/207.99 |
| 2011/0074970 | A1* | 3/2011 | Sukegawa | H04N 23/61 348/222.1 |
| 2011/0135154 | A1 | 6/2011 | Wedge | |

FOREIGN PATENT DOCUMENTS

JP    2014-011638 A    1/2014

OTHER PUBLICATIONS

J. Redmon, A. Farhadi, "YOLO9000:Better Faster Stronger", Computer Vision and Pattern Recognition(CVPR) 2016 http://pjreddie.com/yolo9000/.

(Continued)

*Primary Examiner* — Daniel M Pasiewicz
(74) *Attorney, Agent, or Firm* — Cowan, Liebowitz & Latman, P.C.

(57) ABSTRACT

An information processing apparatus that comprises a mounting mechanism for detachably mounting a device with an analysis processing executing function, comprises a sending unit that sends, to the device, data for analysis including a plurality of pieces of subdata for analysis processing via a first command and location information indicating a location of each of the plurality of pieces of subdata in the data for analysis via a second command, and an obtaining unit that obtains, from the device, a plurality of results obtained by the device executing the analysis processing on the plurality of pieces of subdata.

27 Claims, 15 Drawing Sheets

(51) Int. Cl.
*H04N 23/661* (2023.01)
*H04N 1/00* (2006.01)
*H04N 23/63* (2023.01)

(52) U.S. Cl.
CPC ............... *H04N 2201/0051* (2013.01); *H04N 2201/0084* (2013.01)

(56) References Cited

OTHER PUBLICATIONS

The U.S. Publication 1 and Non-Patent Literature Document 2 were cited in a European Search Report dated Feb. 24, 2022, which is enclosed, that issued in the corresponding European Patent Application No. 21189273.2.

Stephan Hengstler, et al. "MeshEye: A Hybrid—Resolution Smart Camera Mote for Applications in Distributed Intelligent Surveillance", Information Processing in Sensor Networks, 2007, 6th International Symposium On, Information Processing in Sensor Networks, IEEE, PI, Apr. 1, 2007 (Apr. 1, 2007); pp. 360-369.

* cited by examiner

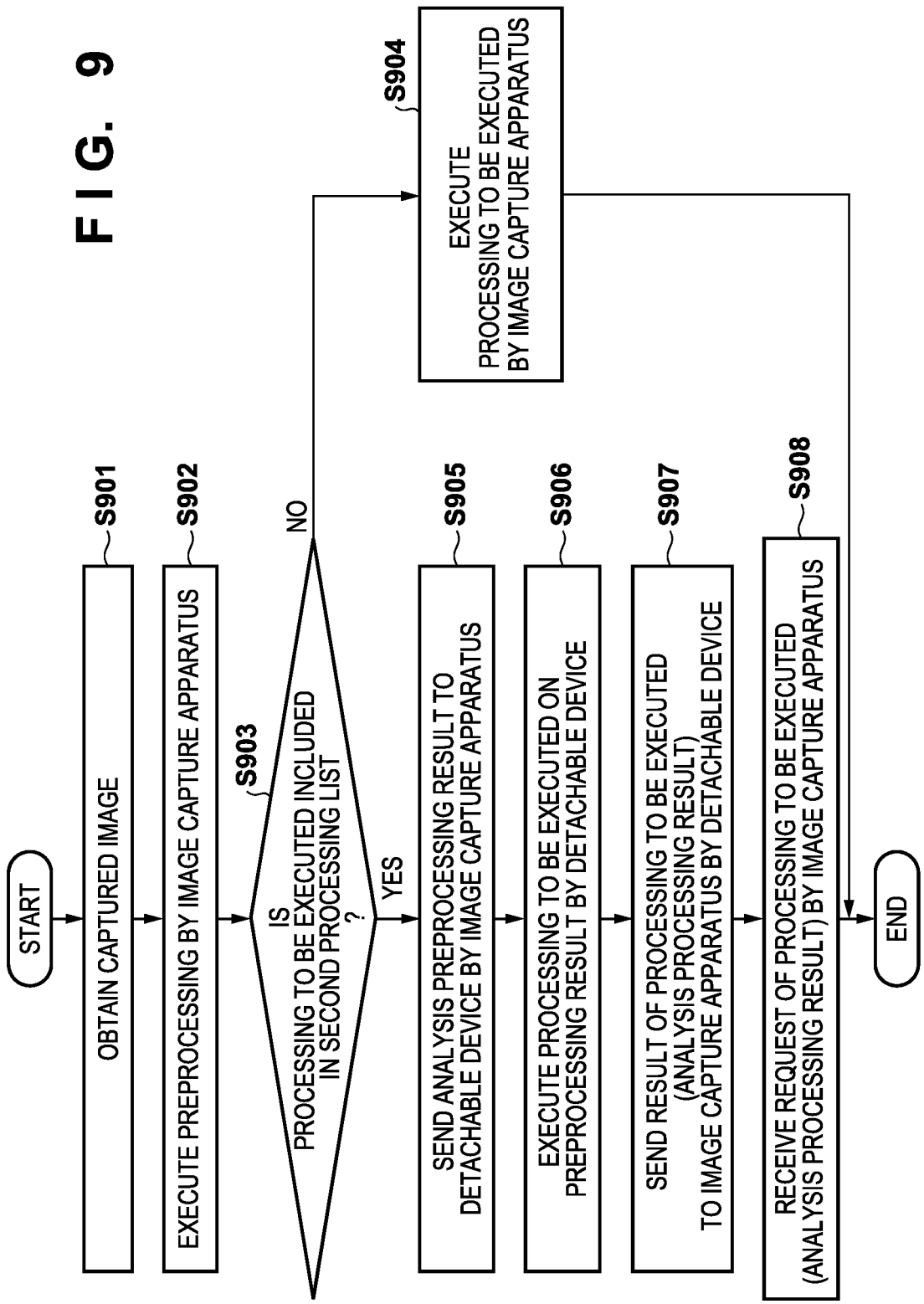

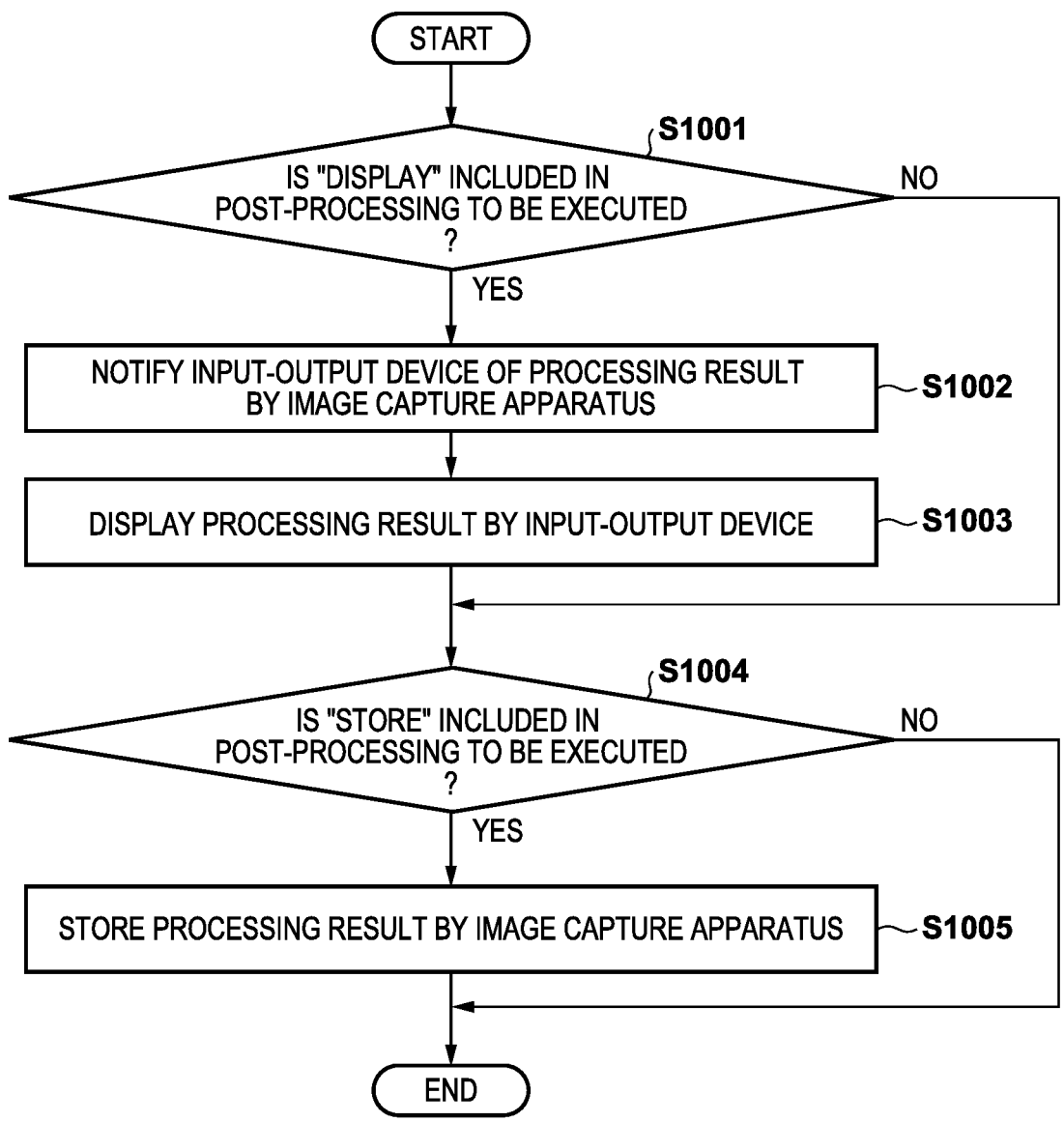

| 1401a | 1401b | 1401c | 1401d | 1401e | 1401f |
|---|---|---|---|---|---|
| ANALYSIS RESULT a | ANALYSIS RESULT b | ANALYSIS RESULT c | ANALYSIS RESULT d | ANALYSIS RESULT e | ANALYSIS RESULT f |

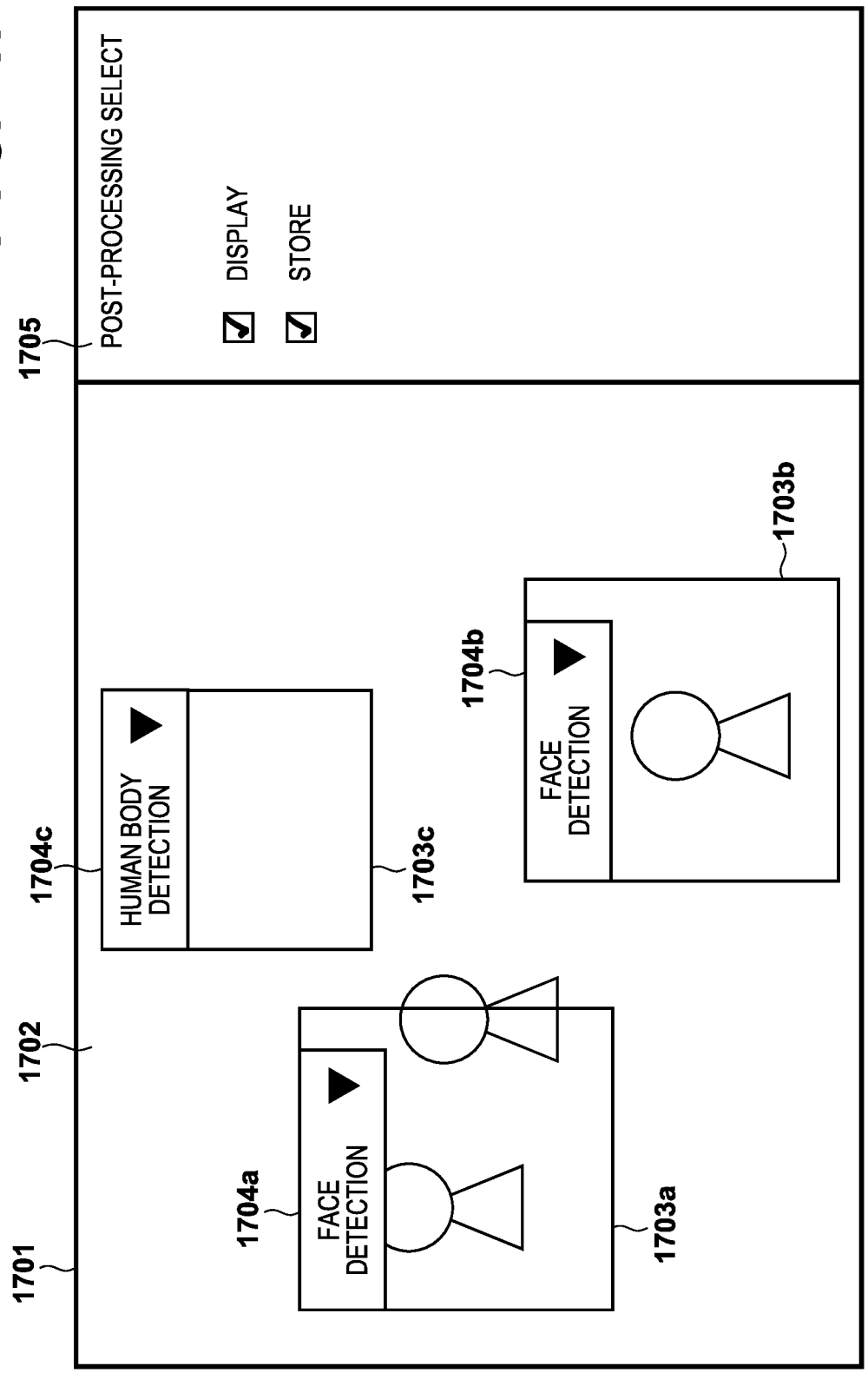

DEVICE, INFORMATION PROCESSING APPARATUS, CONTROL METHOD THEREFOR, AND COMPUTER-READABLE STORAGE MEDIUM

BACKGROUND OF THE INVENTION

Field of the Invention

The present invention relates to a detachable device, an information processing apparatus mountable with the detachable device, a control method therefor, and a computer-readable storage medium.

Description of the Related Art

In recent technologies of image processing of various scenes, for example, the number of objects is estimated on the basis of the result of image analysis that uses an image captured by a surveillance camera to detect and track objects and estimate attributes. This known image processing can be executed by transferring video from a surveillance camera to a high performance arithmetic apparatus, such as a PC or a server, to execute the actual image processing. However, with recent improvements in the processing power of arithmetic apparatuses for mobiles, it has become possible to execute such image processing on the surveillance camera side. Processing on the camera side may be executed by an arithmetic apparatus provided in a camera body. Also, by providing an arithmetic apparatus in a USB detachable device or the like, the processing can be executed at least in part by the detachable device.

There is a demand for detachable devices to have improved processing efficiency for the processing handled by the arithmetic apparatus. In the technology described in Japanese Patent Laid-Open No. 2014-11638 (hereinafter, Patent Document 1), when decoding encoded data, the calculations for decoding can be performed efficiently using position information of a tile set in a frame which is the target for decoding. By having the processing described in Patent Document 1 be executed by the detachable device, the processing efficiency of the detachable device itself can be improved.

However, for an apparatus mountable with a detachable device, it is important that the processes cooperated with the detachable device also be efficiently executed. With the technology described in Japanese Patent Laid-Open No. 2014-11638, only the calculation efficiency of the decoding processing is improved, and no consideration is given to improving the efficiency of the cooperated processes such as communication processing between an apparatus mountable with a detachable device and the detachable device. For example, in a case where a detachable device able to execute the decoding processing of Patent Document 1 is mounted, the apparatus must send data of each tile to be decoded to the detachable device, and thus command communications numbering at least the same as the number of tiles is necessary. Such an increase in the number of command communications leads to a decrease in the efficiency of the cooperated processes of the apparatus and the detachable device.

SUMMARY OF THE INVENTION

According to an aspect of the present invention, technology can be provided for enhancing the processing efficiency of an apparatus mountable with a detachable device and the detachable device.

According to one aspect of the present invention, there is provided an information processing apparatus, comprising: a mounting mechanism for detachably mounting a device with an analysis processing executing function; a sending unit configured to send, to the device, data for analysis including a plurality of pieces of subdata for analysis processing via a first command and location information indicating a location of each of the plurality of pieces of subdata in the data for analysis via a second command; and an obtaining unit configured to obtain, from the device, a plurality of results obtained by the device executing the analysis processing on the plurality of pieces of subdata.

According to another aspect of the present invention, there is provided a device detachably mountable in an information processing apparatus, comprising: an analysis processing unit configured to execute analysis processing on a designated piece of subdata from among data for analysis; a first receiving unit configured to receive data for analysis including a plurality of pieces of subdata, on which the analysis processing is to be executed, according to a first command from the information processing apparatus while the device is mounted in the information processing apparatus; and a second receiving unit configured to receive, from the information processing apparatus, location information indicating a location of each of the plurality of pieces of subdata in the data for analysis according to a second command from the information processing apparatus.

According to another aspect of the present invention, there is provided a control method for an information processing apparatus provided with a mounting mechanism for detachably mounting a device with an analysis processing executing function, the method comprising: sending, to the device, data for analysis including a plurality of pieces of subdata for analysis processing via a first command and location information indicating a location of each of the plurality of pieces of subdata in the data for analysis via a second command; and obtaining, from the device, a result of the device executing the analysis processing.

According to another aspect of the present invention, there is provided a control method for a device detachably mountable in an information processing apparatus, the method comprising: executing analysis processing on a designated piece of subdata from among data for analysis; receiving data for analysis including a plurality of pieces of subdata, on which the analysis processing is to be executed, according to a first command from the information processing apparatus while the device is mounted in the information processing apparatus; and receiving, from the information processing apparatus, location information indicating a location of each of the plurality of pieces of subdata in the data for analysis according to a second command from the information processing apparatus.

According to another aspect of the present invention, there is provided a non-transitory computer-readable storage medium storing a program for causing a computer to execute a control method for an information processing apparatus provided with a mounting mechanism for detachably mounting a device with an analysis processing executing function, the method comprising: sending, to the device, data for analysis including a plurality of pieces of subdata for analysis processing via a first command and location information indicating a location of each of the plurality of pieces of subdata in the data for analysis via a second command; and obtaining, from the device, a result of the device executing the analysis processing.

Further features of the present invention will become apparent from the following description of exemplary embodiments with reference to the attached drawings.

BRIEF DESCRIPTION OF THE DRAWINGS

FIG. 9 is a diagram illustrating an example of the flow of the control to execute the analysis processing.

FIG. 10 is a diagram illustrating an example of the flow of the control to execute post-processing.

FIG. 17 is a diagram illustrating an example of a user interface.

DESCRIPTION OF THE EMBODIMENTS

Embodiments will be described in detail below with reference to the attached drawings. Note that the invention according to the scope of the claims are not limited by the embodiments described below. A plurality of advantages of the embodiments are given. However, all of the plurality of advantages are not required for the invention. Also, the plurality of advantages may be combined in a discretionary manner. Furthermore, in the attached drawings, the same or equivalent components are denoted with the same reference number, and redundant descriptions will be omitted.

Also, hereinafter, an image capture apparatus is used as an example of an information processing apparatus including a mounting mechanism for mounting a detachable device. However, no such limitation is intended. For example, the information processing apparatus may be a portable terminal such as a smart phone, a personal computer, or the like. Note that the image capture apparatus is only required to include an image capture function and a mounting mechanism for a detachable device and may optionally include a digital camera, a digital video camera, a smart phone, or the like.

System Configuration

Figure 1:
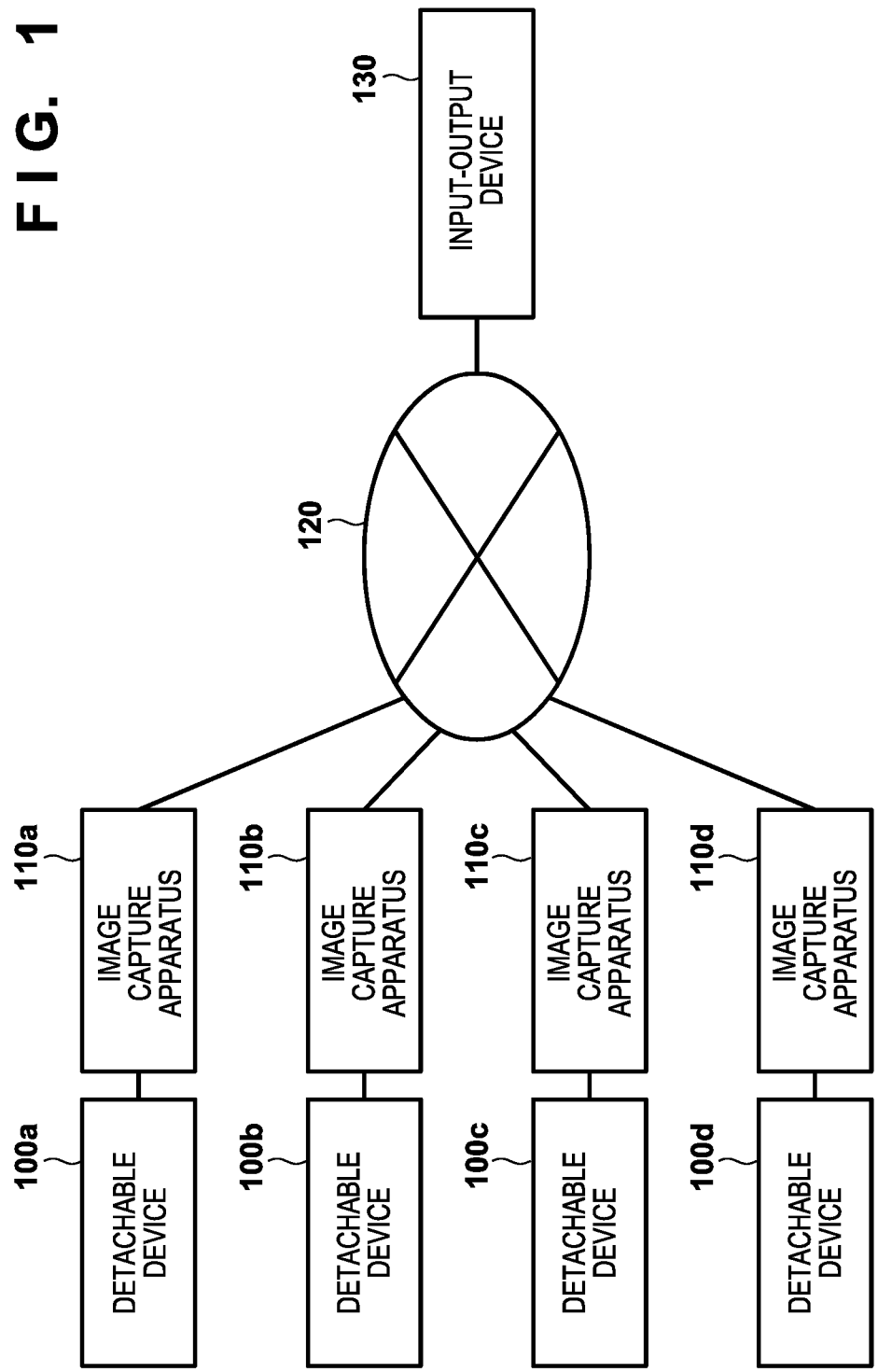
FIG. 1 is a diagram illustrating an example of a system configuration.

FIG. 1 is a diagram illustrating an example of the configuration of an image analysis system of the present embodiment. In this example described below, the system is a system for tracking a specific individual. However, no such limitation is intended, and the following can be applied to a discretionary system that analyzes images and outputs predetermined information. The system of the present embodiment includes image capture apparatuses 110a to 110d, a network 120, and an input-output device 130. Note that the image capture apparatuses 110a to 110d each include a slot where a device able to store captured images can be detachably attached and are connected to detachable devices 100a to 100d by the detachable devices 100a to 100d being inserted into these slots. Note that hereinafter, the detachable devices 100a to 100d are referred to as "detachable device 100" and the image capture apparatuses 110a to 110d are referred to as "image capture apparatus 110".

The detachable device 100 is an arithmetic device detachably attached to the image capture apparatus 110. The detachable device 100, for example, is a device with a predetermined processing circuit installed on an SD card. The detachable device 100, for example, depending on the mode of the SD card, may be configured so that all of it is insertable into the image capture apparatus 110, making the detachable device 100 able to connect with the image capture apparatus 110 without any portion projecting out from the image capture apparatus 110. Also, the detachable device 100, for example, depending on the mode of the SD card, may be configured so that more than half of it is insertable into the image capture apparatus 110, making the detachable device 100 able to connect with the image capture apparatus 110 with only a small portion projecting out from the image capture apparatus 110. Accordingly, the detachable device 100 becoming an obstacle to wiring or the like or causing interference can be prevented, increasing the user-friendliness when using the device. Also, because an SD card slot is provided in many existing network cameras, i.e., the image capture apparatus 110, an expansion function can be provided to an existing image capture apparatus 110 via the detachable device 100. Note that a mode other than an SD card may be used, and, for example, the detachable device 100 may be mounted in the image capture apparatus 110 via a discretionary interface used when a storage apparatus able to at least store images captured by the image capture apparatus 110 is mounted. For example, the detachable device 100 may include a universal serial bus (USB) interface and be configured to be mounted in a USB socket of the image capture apparatus 110. Also, the predetermined processing circuit, for example, may be mounted via a field-programmable gate array (FPGA) programed to execute predetermined processing, or a mode other than this may be used.

The image capture apparatus 110 is an image capture apparatus such as a network camera. In the present embodiment, the image capture apparatus 110 is provided with a built-in arithmetic apparatus capable of video processing. However, no such limitation is intended. For example, an external computer such as a personal computer (PC) connected to the image capture apparatus 110 may be present, of a combination thereof may be treated as the image capture apparatus 110. Also, in the present embodiment, all of the image capture apparatuses 110 are mounted with the detachable devices 100. Note that in FIG. 1, four image capture apparatuses 110 and the detachable devices mounted therein are illustrated. However, the number of these sets of devices may be three or less or five or more. By mounting the detachable device 100 with an image analysis processing function in the image capture apparatus 110, video processing can be executed on the image capture apparatus 110 side without the image capture apparatus 110 having an image analysis processing function. Also, in an embodiment such as the present embodiment in which the arithmetic apparatus for video processing is disposed in the image capture apparatus 110, because the detachable device 100 provided with an arithmetic apparatus is mounted in the image capture apparatus 110, diversification and improvement to the image processing executable on the image capture apparatus 110 side can be achieved.

The input-output device 130 is an apparatus that receives input from a user and outputs information (for example, displays information) to a user. In the present embodiment, for example, the input-output device 130 is a computer such as a PC, and information is input and output by a browser or native application installed on the computer being executed by the built-in processor.

The image capture apparatus 110 and the input-output device 130 are communicatively connected via the network 120. The network 120 includes a plurality of routers, switches, cables, and the like compliant with a communication standard such as Ethernet (registered trademark), for example. In the present embodiment, the network 120 may be a discretionary network for enabling communication between the image capture apparatus 110 and the input-output device 130, and may be configured with a discretionary scale and built via the compliant communication standard. For example, the network 120 may be the Internet, a wired local area network (LAN), a wireless LAN, or the like. Also, the network 120, for example, may be configured to enable communication via a communication protocol compliant with open network video interface forum (ONVIF) standards. However, no such limitation is intended, and the network 120 may be configured to enable communication via another communication protocol such as an original communication protocol.

Apparatus Configuration
Image Capture Apparatus Configuration

Figure 2:
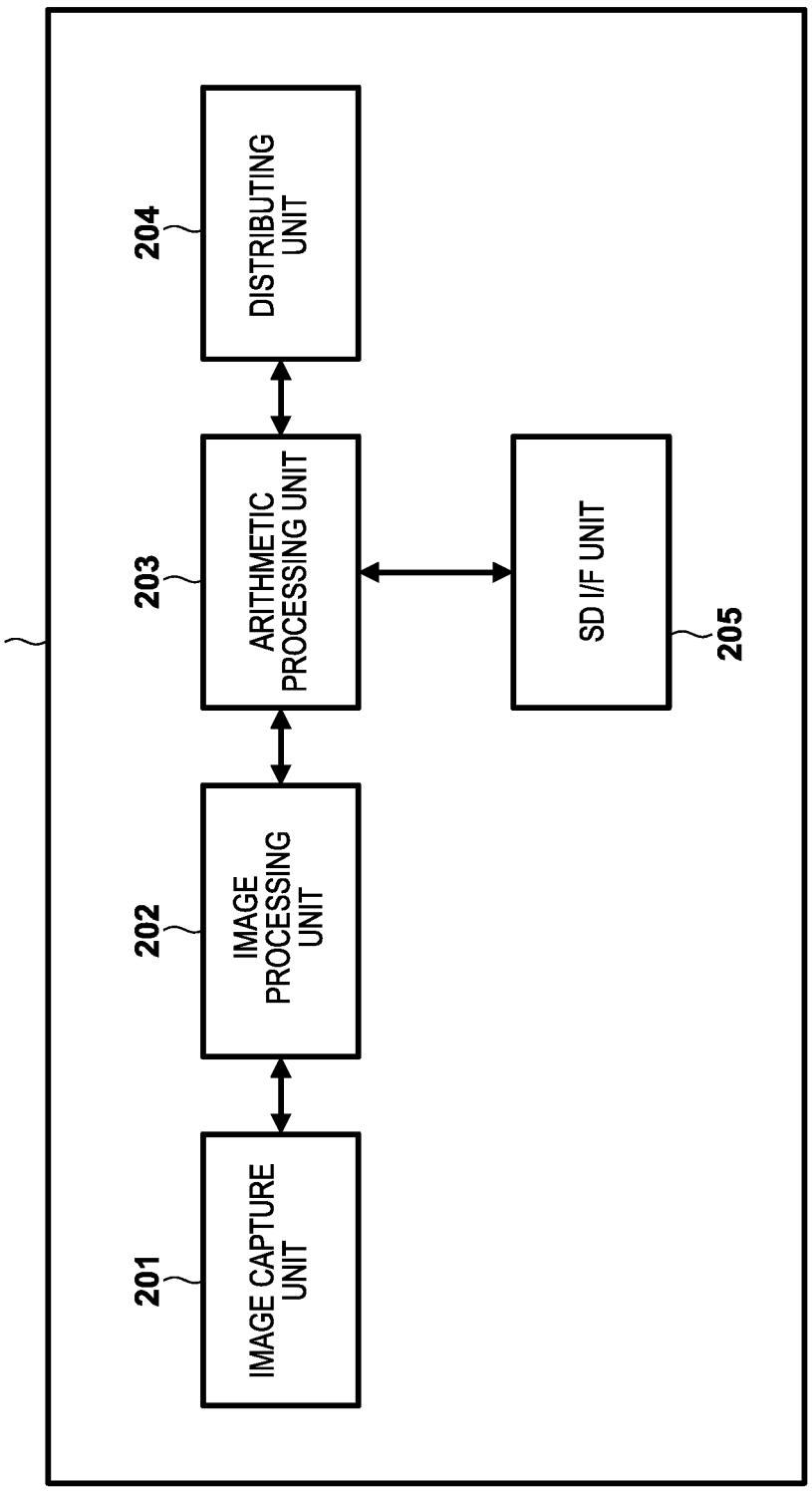
FIG. 2 is a diagram illustrating an example of the hardware configuration of an image capture apparatus.

Next, the configuration of the image capture apparatus 110 will be described. FIG. 2 is a diagram illustrating an example of the hardware configuration of the image capture apparatus 110. The image capture apparatus 110 includes, as hardware components, an image capture unit 201, an image processing unit 202, an arithmetic processing unit 203, a distributing unit 204, and an SD I/F unit 205, for example. Note that I/F is an abbreviation for interface.

The image capture unit 201 includes a lens unit for focusing light and an image sensor that converts the focused light into a corresponding analog signal. The lens unit includes a zoom function for adjusting the angle of view, a diaphragm function for adjusting the amount of light, and the like. The image sensor includes a gain function for adjusting the sensitivity when converting the light into an analog signal. These functions are adjusted on the basis of a setting value reported from the image processing unit 202. The analog signal obtained by the image capture unit 201 is converted into a digital signal via an analog-digital conversion circuit and transferred to the image processing unit 202 as an image signal.

The image processing unit 202 includes an image processing engine, a peripheral device, and the like. The peripheral device, for example, including random-access memory (RAM), a driver for each I/F, and the like. The image processing unit 202 generates image data by performing development processing, filter processing, sensor correction, noise removal, or other similar types of image processing on the image signal obtained from the image capture unit 201. Also, the image processing unit 202 may execute exposure adjustment by sending a setting value to the lens unit or the image sensor and obtaining an appropriate exposure image. The image data generated with the image processing unit 202 is transferred to the arithmetic processing unit 203.

The arithmetic processing unit 203 includes one or more processors such as a CPU or an MPU, memory such as RAM or ROM, a driver for each I/F, and the like. Note that CPU is an acronym for central processing unit, MPU is an acronym for micro processing unit, RAM is an acronym for random-access memory, and ROM is an acronym for read-only memory. The arithmetic processing unit 203, for example, may determine the load sharing between the image capture apparatus 110 and the detachable device 100 to execute the parts of the processing to be executed in the system described above and execute processing corresponding to the determined shared load. The image received from the image processing unit 202 is transferred to the distributing unit 204 or the SD I/F unit 205. The data of the processing result and the processing status is also transferred to the distributing unit 204.

The distributing unit 204 includes a network distributing engine, a peripheral device such as a RAM or ETH PHY module, and the like. ETH PHY module is a module that executes Ethernet physical layer processing. The distributing unit 204 converts the image data and data of the processing result and processing status obtained from the arithmetic processing unit 203 into a format that can be distributed to the network 120 and outputs the converted data to the network 120. The SD I/F unit 205 is an interface part for connecting to the detachable device 100 that includes, for example, a power supply and a mounting mechanism such as an attachment-detachment socket for attaching and detaching the detachable device 100. In this example, the SD I/F unit 205 is configured according to SD standards set by the SD Association. Communications between the detachable device 100 and the image capture apparatus 110, such as the transfer of images obtained from the arithmetic processing unit 203 to the detachable device 100, the obtaining of data from the detachable device 100, and the like, are performed via the SD I/F unit 205.

Figure 3:
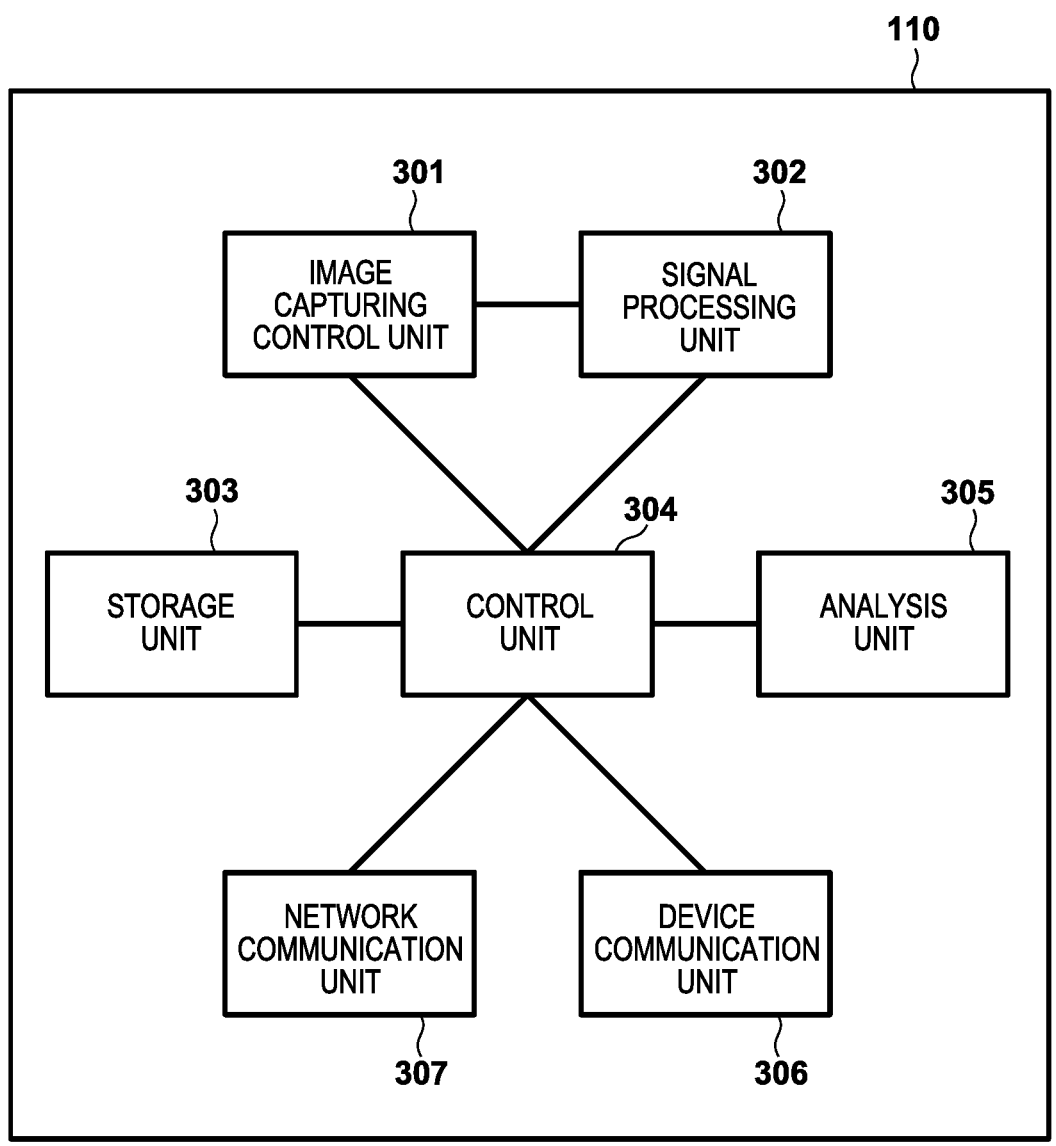
FIG. 3 is a diagram illustrating an example of the functional configuration of the image capture apparatus.

FIG. 3 is a diagram illustrating an example of the functional configuration of the image capture apparatus 110. The image capture apparatus 110 includes, as functions, an image capturing control unit 301, a signal processing unit 302, a storage unit 303, a control unit 304, an analysis unit 305, a device communication unit 306, and a network communication unit 307, for example.

The image capturing control unit 301 executes control to capture images of the surrounding environment via the image capture unit 201. The signal processing unit 302 executes predetermined processing on the image captured by the image capturing control unit 301 and generates data of the captured image. Hereinafter, the data of the captured image is simply referred to as "captured image". The signal processing unit 302 encodes the image captured by the image capturing control unit 301, for example. The signal processing unit 302 encodes a still image using an encoding method such as joint photographic experts group (JPEG), for example. Also, the signal processing unit 302 encodes video using an encoding method, such as H.264/MPEG-4 AVC (hereinafter, referred to as "H.264"), high efficiency video coding (HEVC), or the like. Furthermore, the signal processing unit 302 may perform encoding using an encoding method selected by the user via a non-illustrated operation unit of the image capture apparatus 110, for example, from among a plurality of preset encoding methods.

The storage unit 303 stores a list (hereinafter, referred to as "first processing list") of analysis processing executable by the analysis unit 305 and a list of post-processing relating to the analysis processing results. Also, the storage unit 303 stores the results of the analysis processing described below. Note that in the present embodiment, the executed processing is analysis processing, however discretionary processing may be executed, and the storage unit 303 may be configured to store the first processing list and the post-processing list for the processing relating to the executed processing. The control unit 304 executes control so that the signal processing unit 302, the storage unit 303, the analysis unit 305, the device communication unit 306, and the network communication unit 307 each execute the predetermined processing.

The analysis unit 305 selectively executes at least one of analysis preprocessing, analysis processing, or analysis post-processing on the captured image. Analysis preprocessing is processing executed on the captured image before the analysis processing described below is executed. In the analysis preprocessing of the present embodiment, for example, processing is executed to set a plurality of partial areas which are targets for the analysis processing executed on the captured image. Analysis processing is processing to analyze the input image and output the obtained information. In the analysis processing of the present embodiment, for example, the input is an analysis preprocessing result including a combination of the location information of the plurality of partial areas obtained from the captured image via the analysis preprocessing and image data corresponding to the plurality of partial areas (an image of the area including the plurality of partial areas, or area image). The partial areas and the area image are further described below with reference to FIG. 13. Also, in the analysis processing, at least one of human body detection processing, face detection processing, or vehicle detection processing is executed and processing is executed to output an analysis processing result. Analysis processing may be processing configured to output a location of an object in a captured image using a machine learning model trained to detect an object included in an image via technology described in J.Redmon, A. Farhadi, "YOLO9000: Better Faster Stronger", Computer Vision and Pattern Recognition (CVPR) 2016, for example. Analysis post-processing is processing executed after analysis processing is executed. In the analysis post-processing of the present embodiment, for example, processing is executed to output, as a processing result, a value equal to the sum of the number of objects detected in each partial area on the basis of an analysis processing result for each partial area of the captured image. Note that the analysis processing may be processing including performing pattern matching, detecting an object in an image, and outputting the location.

The device communication unit 306 communicates with the detachable device 100. The device communication unit 306 converts the input data into a format able to be processed by the detachable device 100 and sends the data obtained via conversion to the detachable device 100. Also, the device communication unit 306 receives the data from the detachable device 100 and converts the received data into a format able to be processed by the image capture apparatus 110. In the present embodiment, the device communication unit 306 executes processing to convert decimals from floating-point to fixed-point and vice versa as the conversion processing. However, no such limitation is intended, and the device communication unit 306 may execute a different type of processing. Also, in the present embodiment, the device communication unit 306 sends a command sequence set in advance within the range of SD standards to the detachable device 100 and receives a reply from the detachable device 100 to communicate with the detachable device 100. The network communication unit 307 communicates with the input-output device 130 via the network 120.

Configuration of Detachable Device

Figure 4:
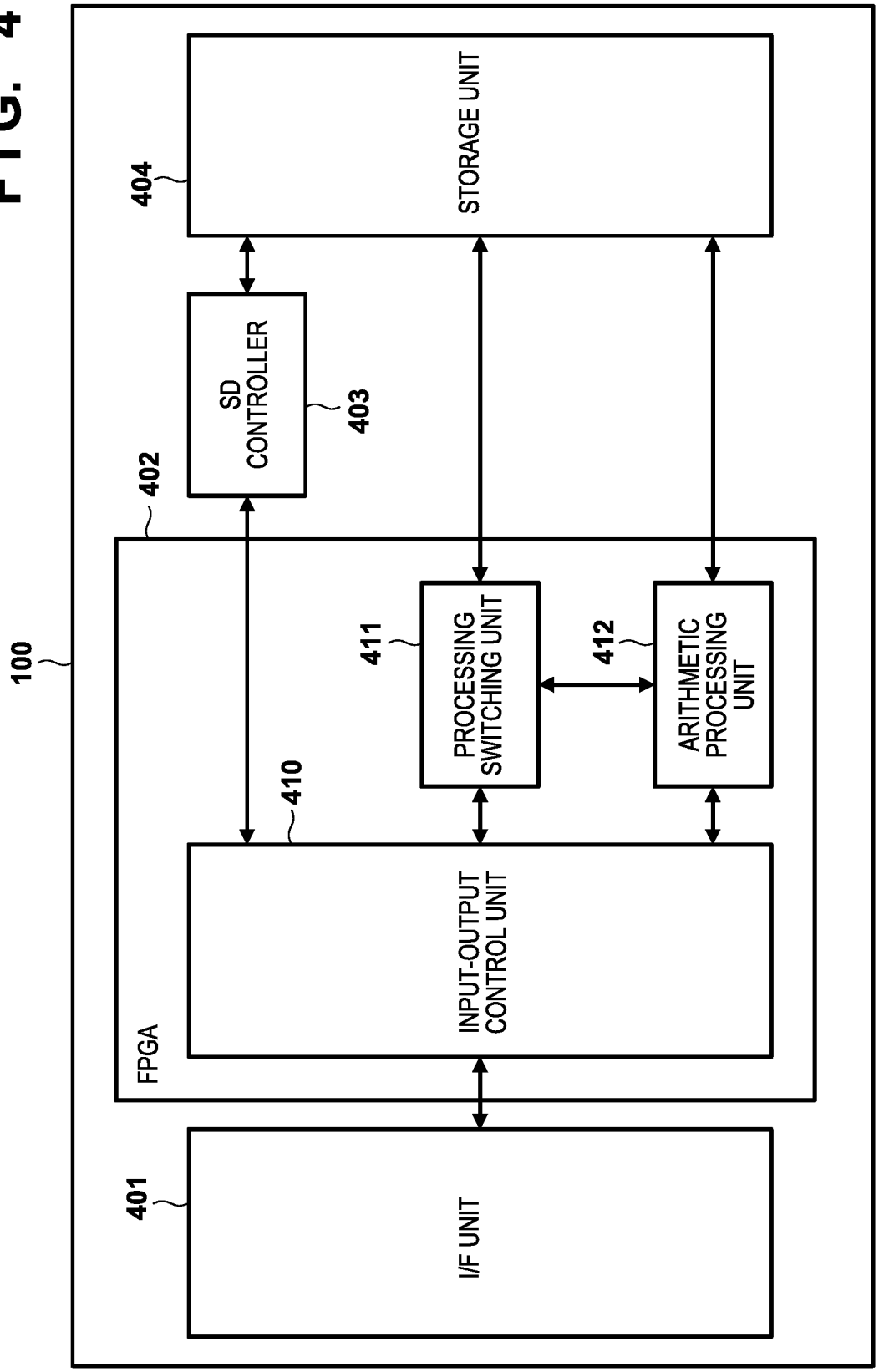
FIG. 4 is a diagram illustrating an example of the hardware configuration of a detachable device.

FIG. 4 is a diagram illustrating an example of the hardware configuration of the detachable device 100. The detachable device 100, for example, includes an I/F unit 401, a FPGA 402, an SD controller 403, and a storage unit 404. The detachable device 100 is configured to be inserted and removed via an attachment-detachment socket of the SD I/F unit 205 provided in the image capture apparatus 110, or in other words, is configured to be compliant with SD standards.

The I/F unit 401 is an interface part for connecting together an apparatus such as the image capture apparatus 110 and the detachable device 100. The I/F unit 401, for example, includes electrical contact terminals for receiving power supply from the image capture apparatus 110 and generating and distributing the power supply used in the detachable device 100. The I/F unit 401, in a similar manner to the SD I/F unit 205 of the image capture apparatus 110, is configured to be compliant with that defined in (compliant with) SD standards. Receiving images and setting data from the image capture apparatus 110 and sending data from the FPGA 402 to the image capture apparatus 110 is executed via the I/F unit 401.

The FPGA 402 includes an input-output control unit 410, a processing switching unit 411, and an arithmetic processing unit 412. The FPGA 402 is a type of semiconductor device with an internal logic circuit structure that can be repeatedly reconfigured. Via the processing implemented by the FPGA 402, a processing function can be added (provided) to the apparatus mounted with the detachable device 100. Also, via the reconfiguration function of the FPGA 402, the logic circuit structure can be changed at a later time. Thus, because the detachable device 100 can be mounted in an apparatus of a rapidly evolving technology field, the apparatus can be made able to execute appropriate processing at the appropriate time. Note that in the present embodiment, FPGA is used. However, as long as the processing described below can be implemented, for example, a general-purpose ASIC or dedicated LSI may be used. The FPGA 402 is activated by setting data including information of the logic circuit structure to be created being written from a dedicated I/F or by the setting data being read out from a dedicated I/F. In the present embodiment, the setting data is stored in the storage unit 404. When power is supplied, the FPGA 402 reads out setting data from the storage unit 404 and creates and activates a logic circuit. However, no such limitation is intended, and, for example, by implementing a dedicated circuit in the detachable device, the setting data may be written by the image capture apparatus 110 to the FPGA 402 via the I/F unit 401.

The input-output control unit 410 includes a circuit for sending and receiving images to and from the image capture apparatus 110, a circuit for analyzing the commands received from the image capture apparatus 110, a circuit for executing control on the basis of the analysis result, and the like. A command in this example is defined by SD standards, and the input-output control unit 410 can detect some of these. The functions will be described in detail below. The input-output control unit 410 executes control to send an image to the SD controller 403 in the case of storage processing and send an image to the arithmetic processing unit 412 in the case of image analysis processing. Also, the input-output control unit 410 sends setting data to the processing switching unit 411 in a case where setting data of a processing switch is received. The processing switching unit 411 includes a circuit for, on the basis of the setting data received from the image capture apparatus 110, obtaining information of the image analysis processing function from the storage unit 404 and writing this to the arithmetic processing unit 412. The information of the image analysis processing function is, for example, a setting parameter indicating the order or type of arithmetic, the coefficient of the arithmetic, and the like processed in the arithmetic processing unit 412. The arithmetic processing unit 412 includes a plurality of arithmetic circuits required for executing the image analysis processing function. The arithmetic processing unit 412, on the basis of the information of the image analysis processing function received from the processing switching unit 411, executes the items of arithmetic processing, sends the processing result to the image capture apparatus 110, and/or stores the processing result in the storage unit 404. In this manner, the FPGA 402 extracts the setting data of the processing function to be executed included in the setting data corresponding to the plurality of processing functions stored in advance and rewrites the processing contents to be executed by the arithmetic processing unit 412 on the basis of the setting data extracted. Accordingly, the detachable device 100 is able to selectively execute at least one of the plurality of processing functions. Also, by adding setting data of newly added processing on an ad hoc basis, the new processing can be executed on the image capture apparatus 110 side. Note that hereinafter, including a plurality of pieces of setting data correspond to the plurality of processing functions is expressed by the expression "including a plurality of processing functions". In other words, even in an example where the FPGA 402 of the detachable device 100 is configured to execute a single processing function, when the processing contents of the arithmetic processing unit 412 can be changed by the setting data for another processing function, the expression "including a plurality of processing functions" is used.

The SD controller 403 is a known control integrated circuit (IC) such as one defined by SD standards and executes control of the slave operation of the SD protocol and control of writing data to the storage unit 404. The storage unit 404 is constituted of NAND flash memory, for example, and store various types of information, such as storage data written from the image capture apparatus 110, information of the image analysis processing function written to the arithmetic processing unit 412, setting data of the FPGA 402, and the like.

Figure 5:
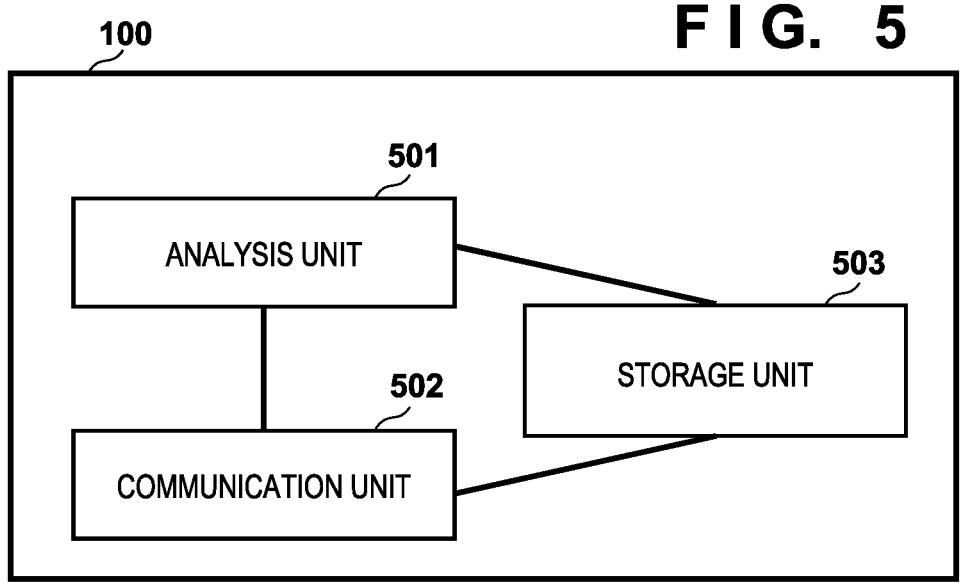
FIG. 5 is a diagram illustrating an example of the functional configuration of the detachable device.

FIG. 5 is a diagram illustrating an example of the functional configuration of the detachable device 100. The detachable device 100, as a functional configuration, includes an analysis unit 501, a communication unit 502, and a storage unit 503, for example. The analysis unit 501 executes analysis processing on an image. In a case where an analysis processing setting request is input, the analysis unit 501 executes setting up the setup to a state in which the input analysis processing is executable. Also, in a case where an image is input, the analysis unit 501 executes the analysis processing set to an executable state on the input image. In the present embodiment, the executable analysis processing is human body detection processing and face detection processing. However, no such limitation is intended. For example, the processing may be to determine whether or not a person stored in advance is included in an image. For example, the degree of match between an image feature value of a person stored in advance and an image feature value of a person detected in the input image is calculated, and, in a case where the degree of match is equal to or greater than a threshold, the person is determined to be the person stored in advance. Also, in the processing, for privacy protection, a predetermined mask image may be superimposed over the person detected in the input image or mosaic processing may be executed. Furthermore, processing may be executed to detect whether the person in the image is performing a specific action using a learning model trained for the specific action of a person via machine learning. Also, processing may be executed to determine what kind of area the area in the image is. For example, processing may be executed to determine what kind of area the area in the image is using a learning model trained for buildings, roads, person, sky, and the like via machine learning. In this manner, the executable analysis processing is applicable to image analysis processing using machine learning as well as image analysis processing not using machine learning. Also, the types of analysis processing described above may be executed by the detachable device 100 only or may be executed by the detachable device 100 in cooperation with the image capture apparatus 110. The communication unit 502 communicates with the image capture apparatus 110 via the I/F unit 401. The storage unit 503 stores information such as the analysis processing setting contents.

Processing Flow

Next, an example of the flow of the processing executed in the system will be described. Note that, from among the items of processing described below, the processing executed by the image capture apparatus 110 is implemented by a processor in the arithmetic processing unit 203 executing a program stored in the memory, for example. However, this is merely one example, and one or more or all of the items of processing described below may be implemented by dedicated hardware. Also, the processing executed by the detachable device 100 and the input-output device 130 may be implemented by a processor in each device executing a program stored in the memory, for example, or one or more or all of the items of processing may be implemented by dedicated hardware.

Overall Flow

Figure 6:
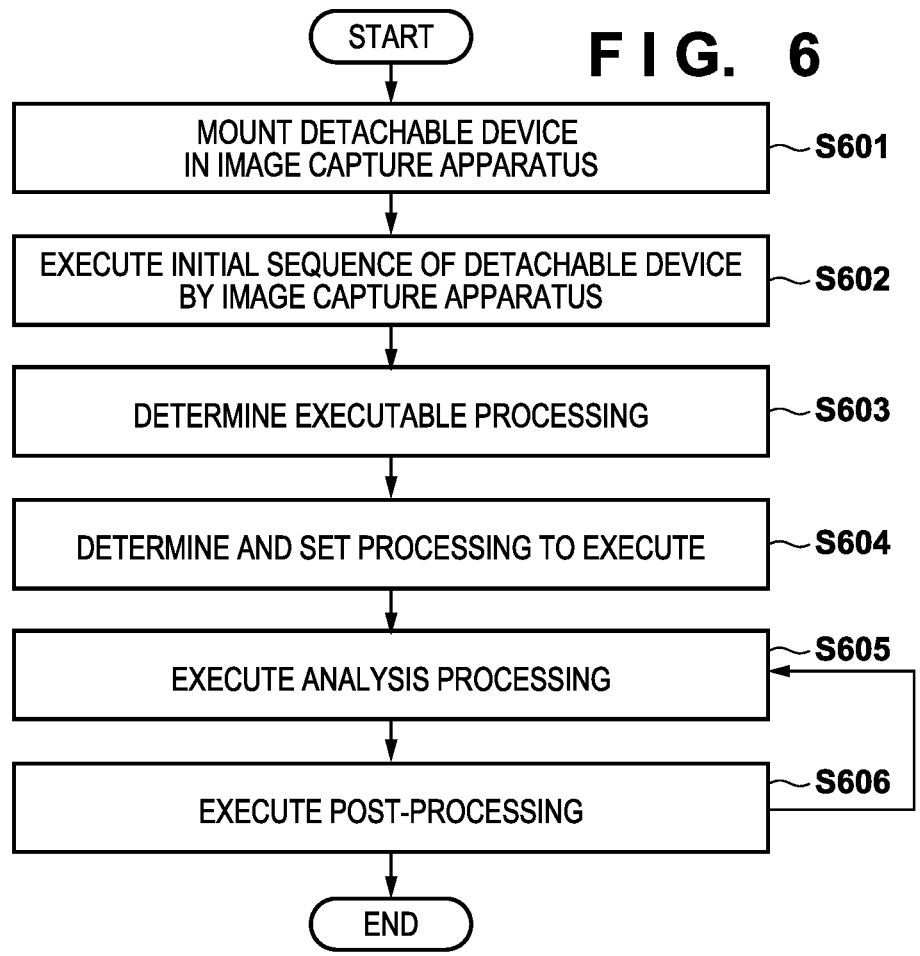
FIG. 6 is a diagram illustrating an example of the flow of the processing executed by a system.

FIG. 6 is a diagram schematically illustrating the flow of the items of image analysis processing executed by the system. In this processing, first, the user mounts the detachable device 100 in the image capture apparatus 110 (step S601). The image capture apparatus 110 executes an initialization sequence of the detachable device 100 (step S602). In the initialization sequence, the image capture apparatus 110 is set to a state in which it is able to use the detachable device 100 by predetermined commands being sent and received to and from the image capture apparatus 110 and the detachable device 100. Then, the image capture apparatus 110 determines the processing executable by the detachable device 100 and determines the processing that is locally executable (executable via the image capture apparatus 110 only or a combination of the image capture apparatus 110 and the detachable device 100) (step S603). Note that the detachable device 100 may be configured to be able to execute discretionary processing, but processing unrelated to the processing to be execute on the image capture apparatus 110 side may not be considered. For example, the image capture apparatus 110 may store a list of the executable processing obtained in advance from the input-output device 130, for example. In this case, when the image capture apparatus 110 obtains information indicating the processing executable by the detachable device 100 from the detachable device 100, the image capture apparatus 110 can determine only the executable processing by determining whether or not the processing is included in the list. Next, the image capture apparatus 110 determines the processing to execute and executes setup of the detachable device 100 as necessary (step S604). In other words, in a case where at least one part of the processing determined to be executed is to be executed by the detachable device 100, the detachable device 100 is setup for the processing. In the setup, reconfiguration of the FPGA 402 may be executed using the setting data corresponding to the processing to be executed, for example. Then, the image capture apparatus 110 or the detachable device 100 executes analysis processing (step S605). Next, the image capture apparatus 110 executes post-processing (step S606). Note that the processing of step S605 and step S606 are repeatedly executed. The processing of FIG. 6, for example, is executed when the detachable device 100 is mounted. However, at least a part of the processing of FIG. 6 may be repeatedly executed, such as the processing of step S603 being executed again, when the detachable device 100 is detached.

Processing to Determine Executable Processing

Figure 7:
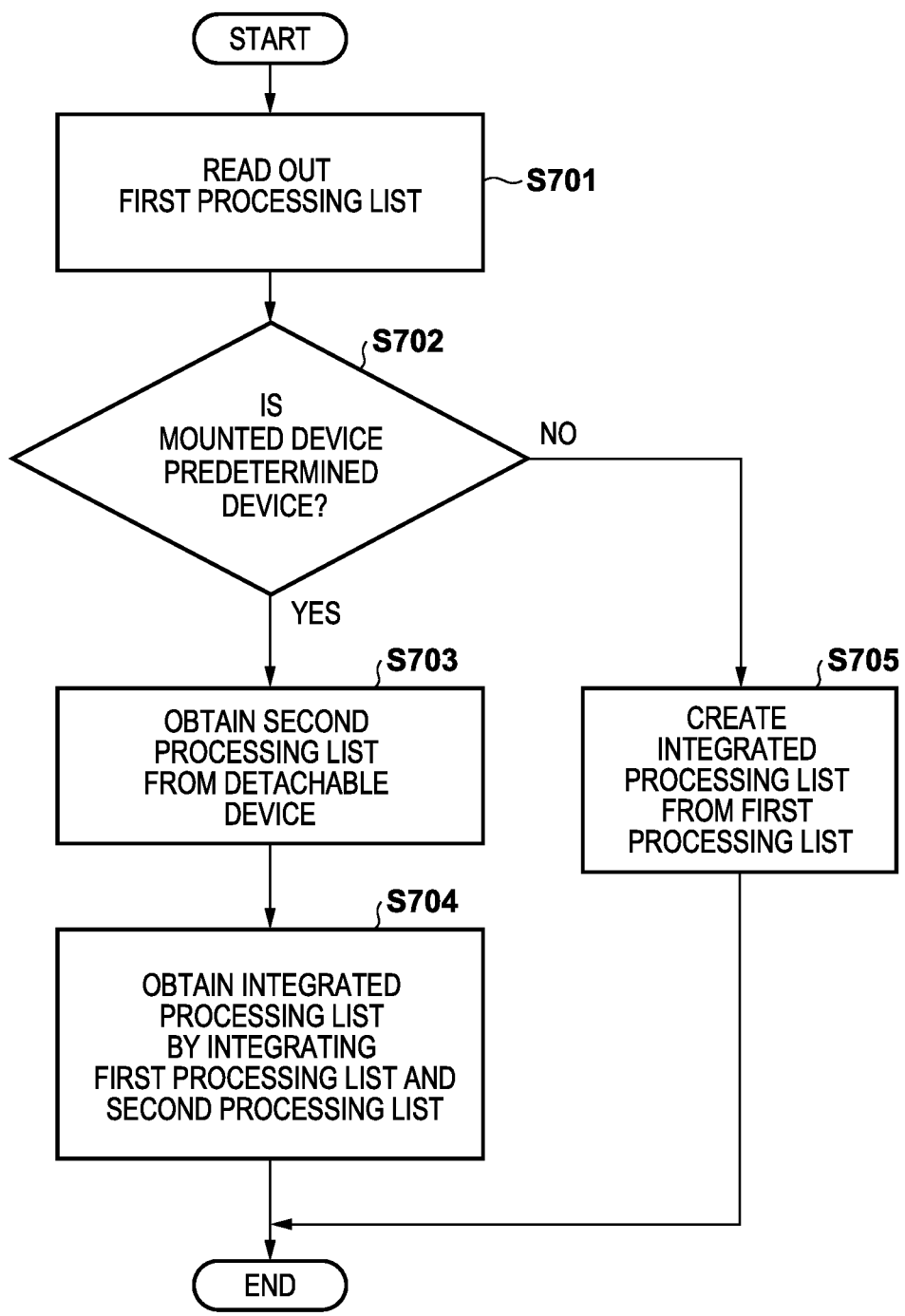
FIG. 7 is a diagram illustrating an example of the flow of the processing to determine the analysis processing.

FIG. 7 is a diagram illustrating an example of the flow of the processing to determine the processing executable by the image capture apparatus 110. This processing corresponds to the processing of step S603 of FIG. 6 and may be executed when a device such as the detachable device 100 is mounted in or removed from the image capture apparatus 110 or when the image capture apparatus 110 is powered on. In this processing, the image capture apparatus 110 reads out the processing executable by the detachable device 100, integrates this with the analysis processing executable by the image capture apparatus 110, and determines the analysis processing executable on the image capture apparatus 110 side.

First, the control unit 304 of the image capture apparatus 110 reads out the first processing list, which is a list of processing executable by the analysis unit 305 of the image capture apparatus 110 stored in the storage unit 303 (step S701). Next, the control unit 304 determines whether the mounted device is a device including only a known storage function, for example, or whether the mounted device is a predetermined device including a specific processing function such as the detachable device 100 (step S702). For example, the control unit 304 controls the device communication unit 306, issues a read out to a specific address request (read type command) to the mounted device, and reads out the flag data stored at the specific address. Then, the control unit 304, on the basis of the read flag data, may determine whether the detachable device 100 is the predetermined device with a specific processing function. However, this is merely one example, and a different method may be used to determine whether or not the mounted device is the predetermined device.

In a case where the mounted device is the predetermined device (YES in step S702), the control unit 304 executes the processing for determining the processing executable by the device (the detachable device 100). The control unit 304 controls the device communication unit 306 and communicates with the detachable device 100 and obtains a list (hereinafter, referred to as "second processing list") of processing executable by the detachable device 100 (step S703). The control unit 304, for example, similar to a case where the detachable device 100 is determined to be the predetermined device or not, may read out the data stored at the specific address (address A described below, see FIG. 12) to obtain the second processing list. Note that, for example, the second processing list may be stored at the same address as the flag data for determining whether or not the detachable device is the predetermined device. In this case, by accessing this address, the image capture apparatus 110 can simultaneously obtain the flag data and the second processing list and can simultaneously execute the processing of step S702 and the processing of step S703. However, no such limitation is intended, and these pieces of data may be stored at different addresses. Then, the control unit 304 creates an integrated processing list including the integrated first processing list of the processing executable by the image capture apparatus 110 read out from the storage unit 303 and the second processing list obtained from the detachable device (step S704) and ends processing.

The integrated processing list is a list indicating the processing executable locally on the image capture apparatus 110 side and not the processing executable by an apparatus such as a server on the network. Note that in the present embodiment, the integrated processing list is a list obtained via the union of the processing included in the first processing list and the processing included in the second processing list and is a list of the processing included in at least one of the first processing list or the second processing list. However, no such limitation is intended, and, for example, in a case where other processing is made executable by combining the processing including in the first processing list and the processing included in the second processing list, this other processing made executable may be added to the integrated processing list.

In a case where the mounted device is not the predetermined device (NO in step S702), the control unit 304 determines that there is no processing executable by the mounted device. Thus, the control unit 304 creates an integrated processing list indicating the processing executable locally on the image capture apparatus 110 side from the first processing list of the processing executable by itself read out from the storage unit 303 (step S705) and ends the processing. Note that when the processing of FIG. 7 is executed upon the device being removed, because the predetermined device is naturally not mounted, the first processing list is treated as the integrated processing list.

In this manner, a list of the processing executable locally on the image capture apparatus 110 side can be created on the basis of whether or not the detachable device 100 able to execute a specific processing is mounted in the image capture apparatus 110. Also, by presenting the user with the integrated processing list as described below, the user is able to select the processing made able to be executed locally on the image capture apparatus 110 side by mounting the detachable device 100.

Processing to Determine Analysis Processing Contents

Figure 8:
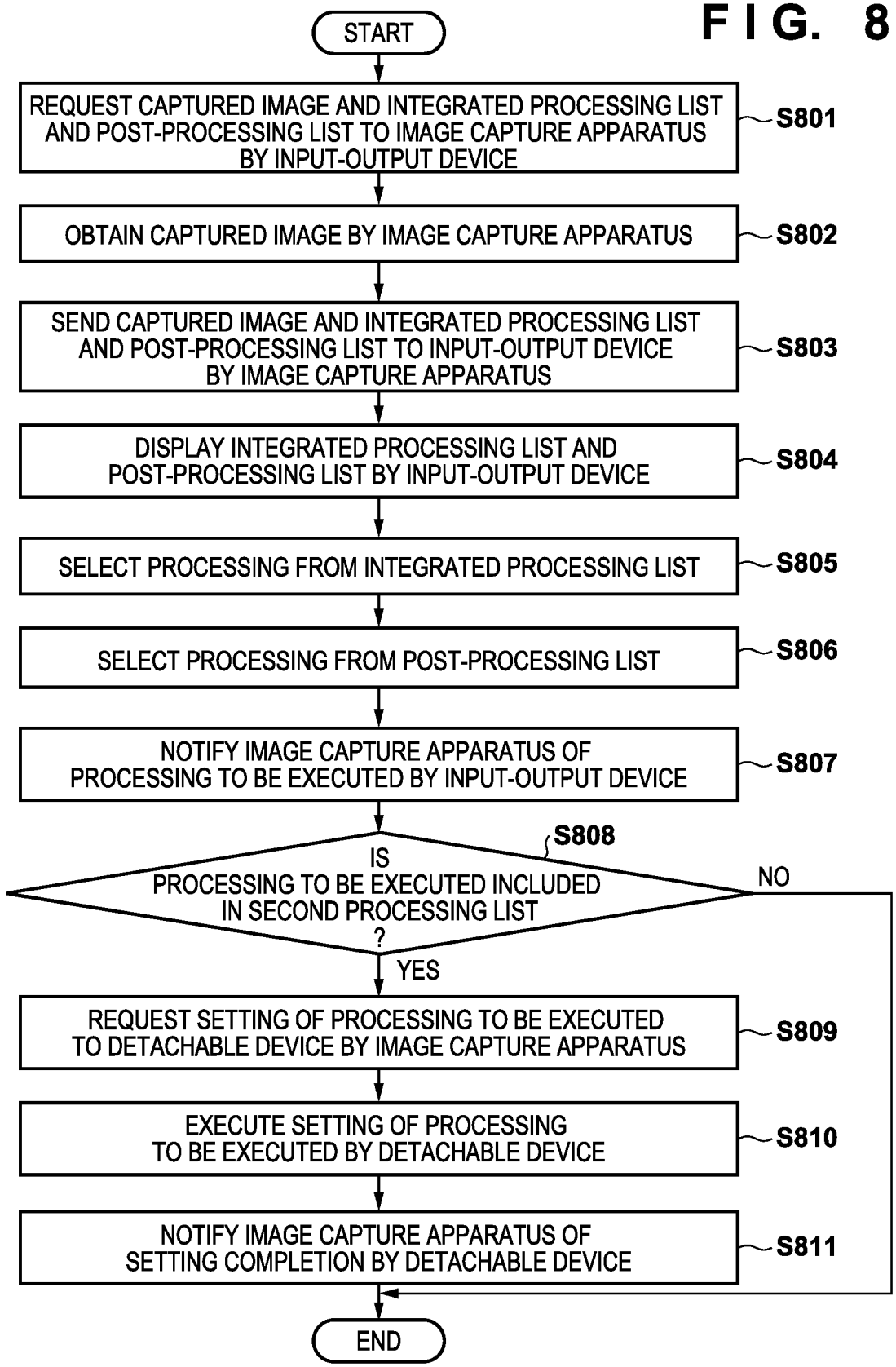
FIG. 8 is a diagram illustrating an example of the flow of the processing to determine the contents of the analysis processing.

FIG. 8 is a diagram illustrating an example of the flow of the processing of the image capture apparatus 110 to determine the analysis processing contents. The processing illustrated in FIG. 8 corresponds to the processing of step S604 of FIG. 6. In this processing, the analysis processing executable locally on the image capture apparatus 110 side is presented to the user via the input-output device 130, and the input-output device 130 receives the user selection. Then, the image capture apparatus 110 determines the analysis processing to execute according to the information indicating the user selection received via the input-output device 130.

In this processing, first, the input-output device 130 executes communication with the image capture apparatus 110 and requests to obtain the captured image, the integrated processing list, and the post-processing list (step S801). The input-output device 130, for example, requests the image capture apparatus 110 to send the information by sending a request message defined by ONVIF standards to the image capture apparatus 110. However, this is merely one example, and requesting the information to be sent may be performed via a different message or the like. In the image capture apparatus 110, on the basis of the request, the image capturing control unit 301 captures an image of the surrounding environment, the control unit 304 controls the signal processing unit 302, processing is executed on the image captured by the image capturing control unit 301, and a captured image is obtained (step S802). Note that the image capture apparatus 110 may continuously obtain a captured image by capturing an image of the surrounding environment regardless of whether or not a request is received. The image capture apparatus 110 may store the captured image locally or may transfer and store the captured image in another apparatus such as a network server or the like. The control unit 304 reads out the post-processing list stored in the storage unit 303. In the present embodiment, the post-processing list includes display processing and storage processing, but no such limitation is intended. The control unit 304 controls the network communication unit 307, and the post-processing list, the integrated processing list obtained via the processing of FIG. 7, and the captured image obtained in step S802 are sent to the input-output device 130 (step S803). The image capture apparatus 110, for example, sends the information to the input-output device 130 by sending to the input-output device 130 a reply message corresponding to the request message defined by the ONVIF standards described above. However, this is merely one example, and the information may be sent via a different message or the like. Note that here, only the processing to be executed may be considered, and the request for the captured image by the input-output device 130 in step S801, the obtaining of the captured image in step S802, and the sending of the captured image to the input-output device 130 in step S803 may not be performed.

The input-output device 130 receives the captured image, the integrated processing list, and the post-processing list from the image capture apparatus 110. Then, the input-output device 130 presents the user with the integrated processing list and the post-processing list via a display on a screen (step S804). Note that at this time, the input-output device 130 may also present to the user via a display on a screen the captured image. Thereafter, the user checks the displayed integrated processing list and the post-processing list and selects the analysis processing to be executed (hereinafter, referred to as "processing to be executed") from the integrated processing list (step S805). Also, the user selects the post-processing to be executed (hereinafter, referred to as "post-processing to be executed" (step S806). The input-output device 130 sends the information indicating the selection result of the processing to be executed and the post-processing to be executed to the image capture apparatus 110 (step S807).

When the control unit 304 of the image capture apparatus 110 controls the network communication unit 307 and receives the information indicating the processing to be executed selected by the user from the input-output device 130, the control unit 304 determines whether or not the processing to be executed is processing included in the second processing list (step S808). Then, in a case where the processing to be executed is not included in the second processing list (NO in step S808), because the processing is to be executed in the image capture apparatus 110, the control unit 304 ends the processing of FIG. 8 without notifying the detachable device 100 or the like. On the other hand, in a case where the processing to be executed is included in the second processing list (YES in step S808), the control unit 304 controls the device communication unit 306 and sends a setting request for the processing to be executed to the detachable device 100 (step S809).

The communication unit 502 of the detachable device 100 receives the setting request for the processing to be executed from the image capture apparatus 110. The communication unit 502 outputs the setting request for the processing to be executed received from the image capture apparatus 110 to the analysis unit 501. The analysis unit 501, on the basis of the setting request for the processing to be executed input from the communication unit 502, obtains the settings for the processing to be executed from the storage unit 503 and executes setup to put the detachable device 100 in a state in which it is able to execute the processing to be executed (step S810). After the setting processing is completed, for example, the communication unit 502 sends a setting completion notification to the image capture apparatus 110 (step S811). Note that it is sufficient that the communication unit 502 notifies of information for making the image capture apparatus 110 not write data at a time when the setup of the detachable device 100 is not complete, and the communication unit 502 may notify the image capture apparatus 110 of information or the like of the setting completion timing before the setting is actually complete. The control unit 304 of the image capture apparatus 110 controls the device communication unit 306 and receives a setting completion notification from the detachable device 100.

The notification of setting completion from the detachable device 100 to the image capture apparatus 110 may be executed using one of the following three methods, for example. In the first notification method, when processing to write the data of a first block from the image capture apparatus 110 is executed, the communication unit 502 outputs a BUSY signal in a case where the setting of the processing to be executed is not complete. The BUSY signal is output by, for example, driving a signal line of the data defined in SD standards in a low state. In this case, the image capture apparatus 110 can determine whether or not the processing to be executed setting is complete by checking for a BUSY signal. In the second notification method, the amount of time until setting completion of the processing to be executed is stored in advance at the specific address described above, and the information of the amount of time until setting completion is read out by the image capture apparatus 110. The image capture apparatus 110 outputs (issues a write type command) write data after the amount of time until setting completion of the processing to be executed has elapsed. Accordingly, the image capture apparatus 110 can be configured to send the data of the captured image after the setting of the processing to be executed is complete. In the third notification method, after the setting of the processing to be executed is complete, the analysis unit 501 writes a flag of setting completion to a second specific address of the detachable device 100. The image capture apparatus 110 can determine whether or not the processing to be executed setting is complete by reading out the data of the second specific address. Note that the information of the address where the setting completion flag is written may be stored at the specific address described above or stored at a different address.

Analysis Processing Execution Control

FIG. 9 is a diagram illustrating an example of the flow of control executed when analysis processing is executed by the image capture apparatus 110. The processing illustrated in FIG. 9 corresponds to the processing of step S605 of FIG. 6. In this processing, the image capturing control unit 301 captures an image of the surrounding environment (step S901). The control unit 304 controls the signal processing unit 302, executes processing of the image captured by the image capturing control unit 301, and obtains a captured image. Thereafter, the control unit 304 controls the analysis unit 305, executes analysis preprocessing on the captured image input from the control unit 304, and obtains an analysis preprocessing result (step S902). Then, the control unit 304 determines whether the processing to be executed is included in the second processing list (step S903).

In a case where the processing to be executed is determined to not be included in the second processing list (NO in step S903), the control unit 304 controls the analysis unit 305 and executes the processing to be executed on the analysis preprocessing result in the image capture apparatus 110 (step S904). In this manner, when the analysis processing result is obtained by the control unit 304, the processing illustrated in FIG. 9 ends, and the processing proceeds to step S606 of FIG. 6 for analysis post-processing to be executed on the analysis processing result.

In a case where the processing to be executed is included in the second processing list (YES in step S903), the control unit 304 controls the device communication unit 306 and sends an analysis preprocessing result to the detachable device 100 (step S905). For example, the control unit 304 sends the analysis preprocessing result to the detachable device 100 by issuing a write request (write type command) for the analysis preprocessing result. The communication unit 502 of the detachable device 100 receives the analysis preprocessing result image from the image capture apparatus 110 and outputs the image received from the image capture apparatus 110 to the analysis unit 501. The analysis unit 501 executes the processing to be executed set in step S810 of FIG. 8 on the image input from the communication unit 502 (step S906). Then, the communication unit 502 sends the analysis processing result obtained from the processing executed by the analysis unit 501 to the image capture apparatus 110 (step S907). The execution of the analysis processing from step S905 to step S907 will be described in detail below. The control unit 304 of the image capture apparatus 110 controls the device communication unit 306 and receives the analysis processing result from the detachable device 100 (step S908). In this manner, when the analysis processing result is obtained by the control unit 304, the processing illustrated in FIG. 9 ends, and the processing proceeds to step S606 of FIG. 6 for analysis post-processing to be executed on the analysis processing result.

Post-Processing Execution Control

FIG. 10 is a diagram illustrating an example of the flow of control executed when post-processing is executed by the image capture apparatus 110. The processing illustrated in FIG. 10 corresponds to the processing of step S606 of FIG. 6. In this processing, the control unit 304 of the image capture apparatus 110 determines whether or not "display" is included in the post-processing to be executed (step S1001). In a case where display is determined to be included in the post-processing to be executed (YES in step S1001), the control unit 304 controls the network communication unit 307 and sends the analysis processing result to the input-output device 130 (step S1002). When the analysis processing result is received from the image capture apparatus 110, the input-output device 130 presents to the user the analysis processing result via a display on a screen (step S1003). On the other hand, in a case where display is determined by the control unit 304 to not be included in the post-processing to be executed (NO in step S1001), the processing of step S1002 and step S1003 is not executed.

Also, the control unit 304 of the image capture apparatus 110 determines whether or not "store" is included in the post-processing to be executed (step S1004). Note that the determination of step S1004 may be executed before step S1001 or may be executed in parallel with step S1001. In a case where store is determined to be included in the post-processing to be executed (YES in step S1004), the control unit 304 controls the storage unit 303, stores the analysis processing result (step S1005), and ends the processing. On the other hand, in a case where store is determined to not be included in the post-processing to be executed (NO in step S1004), the control unit 304 ends the processing without executing the processing of step S1005.

Also, in the embodiments described above, image analysis processing is used as an example of analysis processing. However, the present invention is also applicable to audio analysis processing. For example, the present invention may be applied to processing to detect an audio pattern, such as a scream, a gunshot, or the sound of breaking glass. For example, an audio feature value is extracted via one of various audio data analysis methods including spectrum analysis and the like, and this and the detected audio pattern are compared. Then, by calculating the degree of match, a specific audio pattern can be detected.

Also, in a case of executing audio analysis processing, the audio data is divided into audio data of a predetermined time section, and audio analysis processing is executed using the audio data of this predetermined time section as a unit. Furthermore, the predetermined time section may differ depending on the audio pattern to be detected as appropriate. Thus, audio data for each time section corresponding to the audio pattern targeted for detection is input to the detachable device 100. Also, the detachable device 100 has a function of analyzing the input audio data, the function of storing the input audio data, and the like.

Also, in the embodiments described above, the detachable device 100 is able to non-temporarily store the data input from the image capture apparatus 110. However, in some other embodiments, the detachable device 100 may be unable to non-temporarily store the data input from the image capture apparatus 110. In other words, the detachable device 100 executes analysis processing on the data input from the image capture apparatus 110, and the detachable device 100 does not need to non-temporarily store the data. Putting it another way, the purpose of the detachable device 100 may not be to store data as with normal SD cards, but rather to be able to execute analysis processing.

Communication between Image Capture Apparatus 110 and Detachable Device 100

Here, the communication between the image capture apparatus 110 and the detachable device 100 will be described. The arithmetic processing unit 203 of the image capture apparatus 110 and the SD controller 403 of the detachable device 100 are connected with a power supply line, a GND line, a clock line, a command line, and a data line via a device insertion socket of the SD I/F unit 205 of the image capture apparatus 110. Note that the clock line, the command line, and the data line are connected through the FPGA 402. With the clock line, a clock for synchronization output from the arithmetic processing unit 203 is communicated. With the command line, commands issued for operation requests from the arithmetic processing unit 203 to the SD controller 403 and responses to the commands from the SD controller 403 to the arithmetic processing unit 203 are communicated. With the data line, write data from the arithmetic processing unit 203 and read data from the detachable device 100 are communicated. Also, the arithmetic processing unit 203 can recognize whether or not the detachable device 100 is inserted by determining whether the device detect signal of the device insertion socket of the SD I/F unit 205 is high or low.

The arithmetic processing unit 203 issues a command on the command line to the SD controller 403 after power supply. Then, in response to a response from the SD controller 403 and receiving output data indicating device information as an SD card, the arithmetic processing unit 203 setups the settings including voltage and communication speed (clock frequency) for data communication.

Figure 11A:
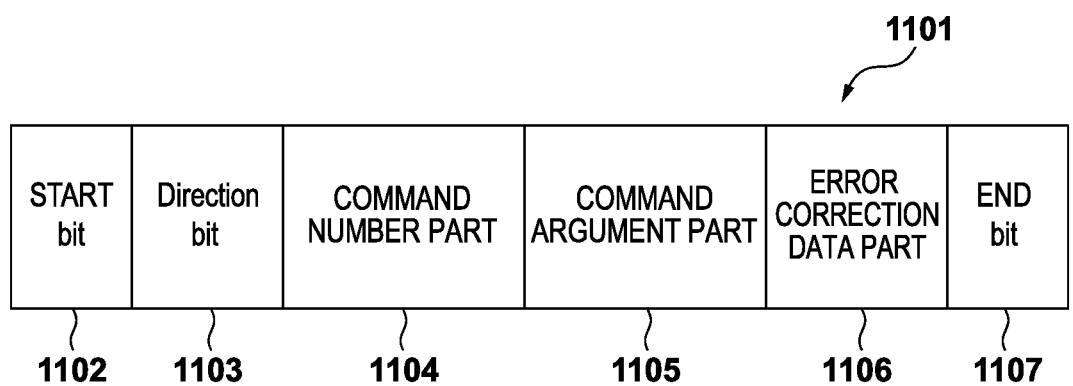
FIGS. 11A and 11B are diagrams illustrating the command and response structure.
Figure 11B:
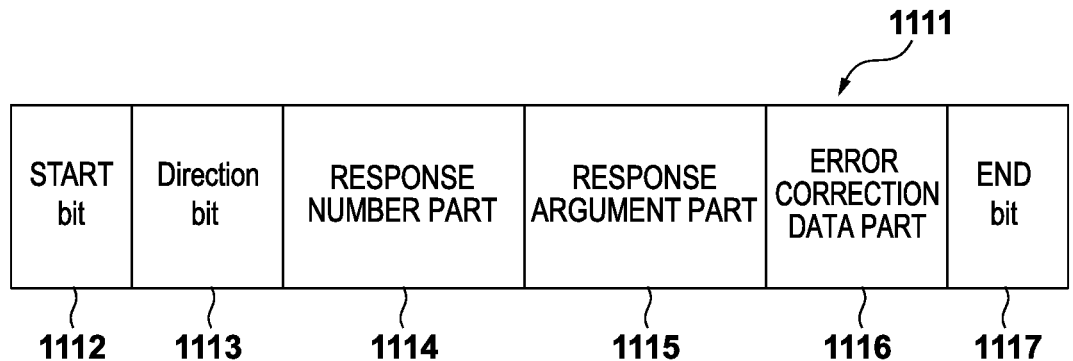

FIGS. 11A and 11B are diagrams illustrating example configurations of a command and response communicated on the command line. The command and response have a configuration compliant with SD standards. FIG. 11A illustrates an example configuration of a command 1101 issued from the arithmetic processing unit 203 to the SD controller 403. The command 1101 includes a command number part 1104, a command argument part 1105, and an error correction data part 1106. In the command number part 1104, a value indicating the type of command is described. For example, the value "23" being stored in the command number part 1104 indicates that the command is a block count designation command that designates the number of data block. Also, the value "25" being stored in the command number part 1104 indicates that the command is a location information transfer command, and the value "12" being stored in the command number part 1104 indicates that the command is a data transfer stop command. In the command argument part 1105, information, such as the number of transfer data block, memory read and write address, and the like, is designated according to the type of command. Also, a command start bit 1102 indicating the start location of the command is added to the first bit of the command, and a command end bit 1107 indicating the end of the command is added to the last bit of the command. Furthermore, a direction bit 1103 indicating a signal output from the image capture apparatus 110 to the detachable device 100 is added behind the command start bit 1102.

FIG. 11B illustrates an example configuration of a response 1111 sent back from the SD controller 403 in response to a command from the arithmetic processing unit 203. The response 1111 includes a response number part 1114 indicating which command the response 1111 is a response to, a response argument part 1115, and an error correction data part 1116. Also, a response start bit 1112 indicating the start location of the response is added to the first bit of the response, and a response end bit 1117 indicating the end location of the response is added to the last bit of the response. Furthermore, a direction bit 1113 indicating a signal output from the detachable device 100 to the image capture apparatus 110 is added behind the response start bit 1112. Information such as the status of the SD card and the like is stored in the response argument part 1115 according to the type of command.

Next, the method of sending and receiving data to and from the arithmetic processing unit 203 and the detachable device 100 will be described. With the SD I/F unit 205, the data is written and read and data is transferred in units of blocks.

The arithmetic processing unit 203 transfers the data of a plurality of blocks to the detachable device 100 via one of the two following methods. In the first method, after the number of blocks is designated by the block count designation command of the transfer data, only the data of the designated number of blocks is transferred via a multi-write type command. For the block count designation command, the number of blocks of the write data is designated in the command argument part 1105, and for the multi-write type command, the address of the storage unit 404 where the data is to be written is designated in the command argument part 1105. In the second method, data transfer is started by a multi-write type command being issued without a block count designation command being issued, and the processing is ended by a transfer stop command being issued when the data transfer has finished. At this time, in the command argument part 1105 of the multi-write type command, only the address of the storage unit 404 to which data is to be written is designated. The arithmetic processing unit 203 can discretionarily switch between the two write methods.

Note that in a case where storage processing is executed, the FPGA 402 inputs the command and data sent from the arithmetic processing unit 203 as is to the SD controller 403, and the SD controller 403 stores the received data at the address of the storage unit 404 designated by the command. In a case where image analysis processing is executed, the FPGA 402 executes analysis processing on the data sent from the arithmetic processing unit 203 and outputs, to the SD controller 403, data of the processing result and information designating the predetermined address of the storage unit 404. The SD controller 403 stores the processing result at the designated address of the storage unit 404.

The arithmetic processing unit 203 reads out the data of a plurality of blocks from the detachable device 100 via one of the two following methods. In the first method, after the number of blocks is designated by the block count designation command, a multi-read type command is issued and the data of only the designated number of blocks is read out. For the block count designation command, the number of blocks of the read data is designated in the command argument part 1105, and for the multi-read type command, the address of the readout source memory of the data is designated in the command argument part 1105. In the second method, data read out is started by a multi-read type command being issued without a block count designation command being issued, and the processing is ended by a transfer stop command being issued. The arithmetic processing unit 203 can discretionarily switch between the two read methods.

Note that in a case where the write data and the read data is for one block, a single-write type command and a single-read type command may be issued to execute writing and reading of the data without issuing a block count designation command and a transfer stop command. With a single-write type command and a single-read type command, in a similar manner to that described above, the address of the storage unit 404 to be accessed is designated in the command argument part 1105.

By writing to the detachable device 100, the arithmetic processing unit 203 can send, to the detachable device 100, data on which storage processing or image analysis processing is to be executed. Also, by reading out from the detachable device 100, the arithmetic processing unit 203 can obtain image data stored in the storage unit 404, the processing result of image analysis processing, and information of the processing function of the image analysis possessed by the detachable device 100.

Figure 12:
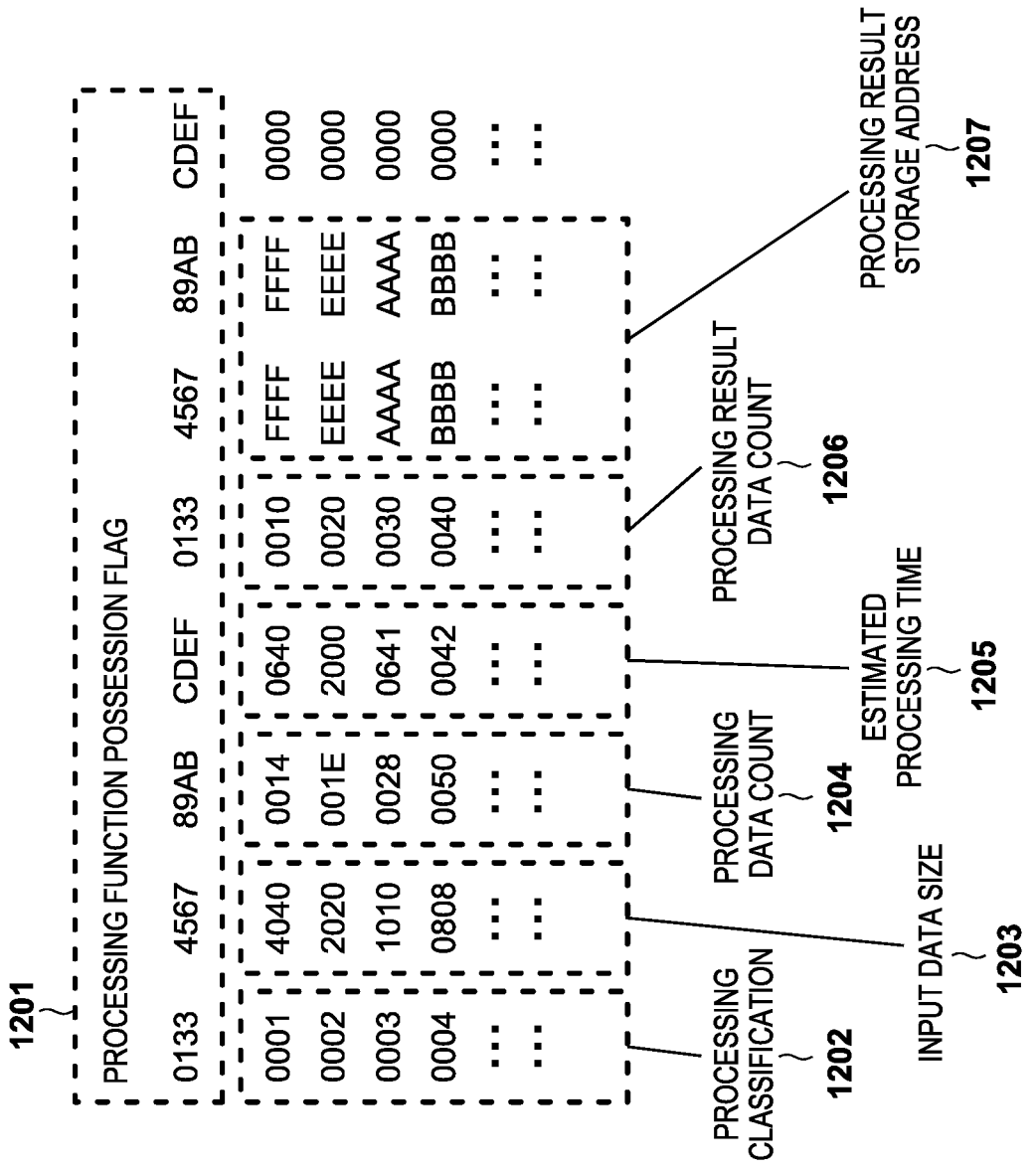
FIG. 12 is a diagram schematically illustrating data in an address storing information of processing functions.

The detachable device 100 of the present embodiment stores information of the processing function possessed by itself in a specific address A of the storage unit 404. The arithmetic processing unit 203 of the image capture apparatus 110 can check the information of the processing function possessed by the detachable device 100 by issuing a multi-read type command or a single-read type command to the address A. The information of the processing function in this example includes whether or not a processing function is possessed, the amount of time required for completion in a case where processing is executed, the data size of the processing result, and information of the address where the processing result is stored. The arithmetic processing unit 203 obtains the second processing list on the basis of the information of the processing function read out from the address A. FIG. 12 is a diagram illustrating an example of the information of the processing function. A processing function possession flag 1201 indicates that the detachable device 100 has an image analysis processing function. The image capture apparatus 110 determines whether or not the detachable device 100 has an image analysis processing function by checking the processing function possession flag 1201. A processing function classification 1202 indicates the analysis processing possessed by the detachable device 100. An input data size 1203 and a processing data count 1204 indicate information relating to how the data of each processing function is input. Also, an estimated processing time 1205 indicates the amount of time it takes from data input to processing result output, and a processing result data count 1206 indicates the number of pieces of data of the processing result. A processing result storage address 1207 indicates where in the storage unit 404 the processing result is stored.

Also, in a case where a read-type command is not issued to the address A from the arithmetic processing unit 203, the detachable device 100 determines that the device it is mounted in is a device that is unable to use an image analysis processing function. In this case, the detachable device 100 may be configured to execute only storage processing to store transferred data in the storage unit 404. In this manner, the detachable device 100 can function as only a memory device for a device that does not require an image analysis processing function. In this example, a method of storing the information of the processing function at the specific address A of the storage unit 404 is used. However, no such limitation is intended. For example, information of the processing function may be added to the response argument part 1115 for a response to a command used upon the initial setup of the detachable device 100.

Note that the image capture apparatus 110, for example, executes reading of the address A of the storage unit 404 after the initialization setup of the detachable device 100 is complete. Also, in a case where a device stops being detected in the socket, the image capture apparatus 110 destroys the read information. In a case where the device is inserted into the socket after the information is destroyed, the image capture apparatus 110 again reads out the value of the address A after the initialization setup is complete. In this manner, in a case where different detachable devices are inserted, the image capture apparatus 110 can read out the information of the possessed function of the detachable device and perform setup.

Analysis Processing Execution

Next, the processing from the image capture apparatus 110 executing writing of the analysis preprocessing result to the detachable device 100 to executing obtaining of the analysis result will be described in detail.

Figures 13, 14:
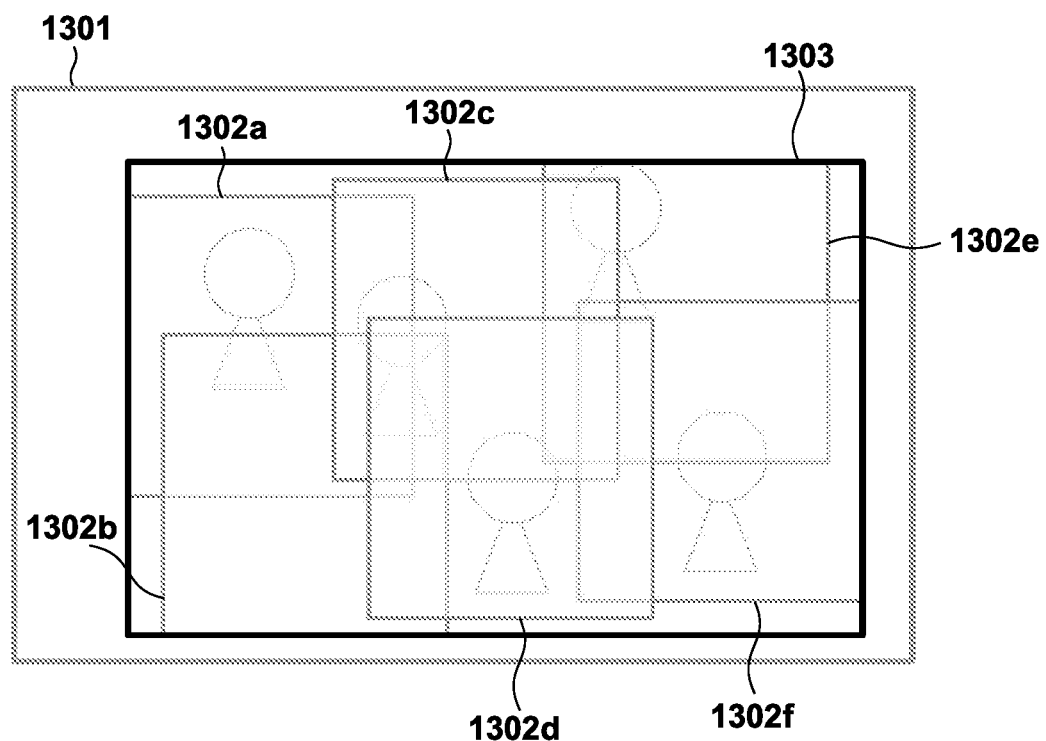
FIG. 13 is a diagram illustrating an example of an image and partial areas for analysis processing.
FIG. 14 is a diagram illustrating an example of analysis processing results for the partial areas.

FIG. 13 is a diagram illustrating an example of the captured image on which analysis processing is to be executed and partial areas. In this example, six partial areas 1302a to 1302f are set in a captured image 1301. For example, the arithmetic processing unit 203 detects a moving body using analysis preprocessing on the captured image 1301 and sets rectangular areas enclosing the detected moving body as partial areas. Note that hereinafter, the partial areas 1302a to 1302f are referred to as "partial areas 1302". Also, the area image 1303 is image data (actual data) extracted from the captured image 1301 that includes all of the partial areas 1302. The partial areas and the area image correspond to an example of the analysis preprocessing result. In the present embodiment, area image 1303 is a rectangle circumscribing the union of the partial areas 1302, however no such limitation is intended. The area image 1303, for example, may be image data corresponding to the captured image 1301 or may be image data generated by combining the image data corresponding to each partial area 1302. Note that in the present embodiment, the number of the partial areas 1302 is set to six, however no such limitation is intended and a discretionary number of the partial areas 1302 may be set. Also, in the present embodiment, the partial areas 1302 partially overlap one another, however no such limitation is intended. For example, the partial areas 1302 may fully overlap one another, or the partial areas 1302 may not overlap at all.

FIG. 14 is a diagram illustrating an example of the analysis processing result from the partial areas 1302. In this example, analysis processing results 1401a to 1401f, corresponding to the partial areas 1302a to 1302f, are output. Note that hereinafter, the analysis processing results 1401a to 1401f are referred to as "analysis processing results 1401".

Figure 15:
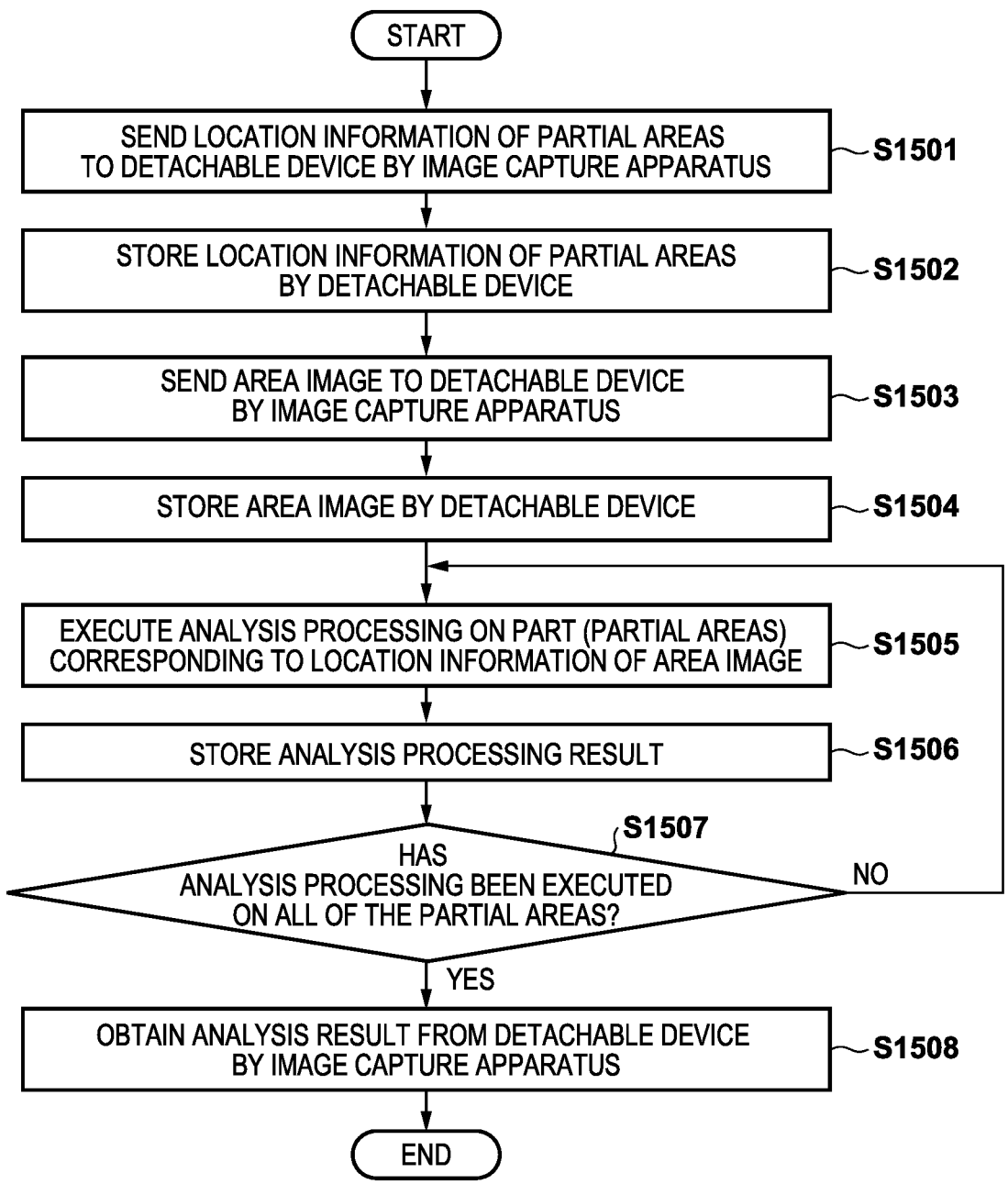
FIG. 15 is a diagram illustrating the flow of the control to execute analysis processing on the partial areas.

FIG. 15 is a diagram illustrating an example of the flow of control to execute analysis processing on the partial areas 1302. In steps S1501 to S1504, an analysis preprocessing result is sent from the arithmetic processing unit 203 to the detachable device 100. First, the arithmetic processing unit 203 of the image capture apparatus 110 issues a location information transfer command compliant with SD standards to the detachable device 100 and sends location information of all of the partial areas 1302 (step S1501). In the present embodiment, the location information transfer command is implemented by a combination of a block count designation command and a multi-write type command. However, no such limitation is intended. Also, in the present embodiment, the location information of the partial areas 1302 is a combination of the location (for example, coordinates) and the size of each of the partial areas 1302 in the area image 1303. However, no such limitation is intended. Furthermore, in a case where the size of the partial areas is preset via analysis processing, the location information may only represent the location of the partial areas. The FPGA 402 stores the sent location information of all of the partial areas 1302 in the storage unit 404 (step S1502).

The arithmetic processing unit 203 of the image capture apparatus 110 issues an image data transfer command compliant with SD standards to the detachable device 100 and sends the area image 1303 (step S1503). In the present embodiment, the image data transfer command is implemented by a combination of a block count designation command and a multi-write type command. However, no such limitation is intended. The FPGA 402 stores the sent area image 1303 in the storage unit 404 (step S1504). Note that the captured image 1301 may be sent instead of the area image 1303. However, compared to sending the captured image 1301, sending the area image 1303 results in a lower amount of data being sent, allowing communication processing efficiency to be improved.

The FPGA 402 reads out, from the storage unit 404, the location information of one of the partial areas 1302 on which analysis processing has not yet been executed. The FPGA 402 reads out an image, from the area image 1303, of the area corresponding to the read location information from the storage unit 404 and executes analysis processing on the read image to obtain the analysis processing result 1401 for the partial area 1302 (step S1505). Then, the FPGA 402 stores the obtained analysis processing result 1401 in the storage unit 404 (step S1506). The FPGA 402 determines whether or not analysis processing has been executed on all of the partial areas 1302 (step S1507). In a case where analysis processing has not been executed on all of the partial areas 1302 (NO in step S1507), the processing proceeds to step S1505. In a case where analysis processing has been executed on all of the partial areas 1302 (YES in step S1507), the arithmetic processing unit 203 of the image capture apparatus 110 issues an analysis processing result transfer command compliant with SD standards to the detachable device 100. Note that the arithmetic processing unit 203 may issue an analysis processing result transfer command after receiving a notification of the completion of analysis processing from the detachable device 100. Alternatively, the arithmetic processing unit 203 may issues an analysis processing result transfer command after a predetermined amount of time has elapsed from when an analysis preprocessing result (area image, partial areas) is sent to the detachable device 100. The predetermined amount of time may be calculated on the basis of the information of the estimated processing time 1205, for example. The SD controller 403 receives an analysis processing result transfer command via the FPGA 402 and outputs the analysis processing results 1401 corresponding to all of the partial areas 1302 stored in the storage unit 404 to the arithmetic processing unit 203 of the image capture apparatus 110 (step S1508). After the analysis processing results are output, the analysis processing by the detachable device 100 ends. Note that in a case where analysis processing is still being executed by the detachable device 100 when an analysis processing result transfer command is received from the arithmetic processing unit 203, the detachable device 100 may wait until the analysis processing ends and then send the analysis processing results to the arithmetic processing unit 203.

In the present embodiment, as described above, the image capture apparatus 110 sends the location information of the plurality of partial areas 1302 to the detachable device 100 via a location information transfer command and sends the area image 1303 corresponding to the plurality of partial areas 1302 via an image data transfer command. In this manner, information relating to a plurality of partial areas can be sent via a single command. Thus, the efficiency of the communication between the image capture apparatus 110 and the detachable device 100 can be improved. Accordingly, the processing efficiency of an apparatus mountable with a detachable device and the detachable device can be enhanced.

Note that in the present embodiment, the arithmetic processing unit 203 of the image capture apparatus 110 sends the area image 1303 via an image data transfer command after the location information of the partial areas 1302 is received via a location information transfer command. However, no such limitation is intended. The arithmetic processing unit 203 of the image capture apparatus 110 may send the location information of the partial areas 1302 via a location information transfer command after the area image 1303 is sent via an image data transfer command.

Also, analysis processing may be executed on the same partial areas 1302 in a plurality of captured images 1301. In this case, the arithmetic processing unit 203 of the image capture apparatus 110 may send the location information of the partial areas 1302 via a location information transfer command only when executing analysis processing on the first captured image 1301. This processing may be implemented be repeating the steps S1503 to S1508, in the flowchart of FIG. 15, for the captured images from the second one onward. In this case, the arithmetic processing unit 203 of the image capture apparatus 110 does not issue a location information transfer command when analysis processing is executed on the captured image 1301 for the second one onward. The FPGA 402 of the detachable device 100 may store the location information sent from the arithmetic processing unit 203 in the analysis of the first captured image 1301 in the storage unit 404 and uses this for the captured images of the second one onward when executing analysis processing of the plurality of partial areas 1302.

First Modified Example

Figure 16:
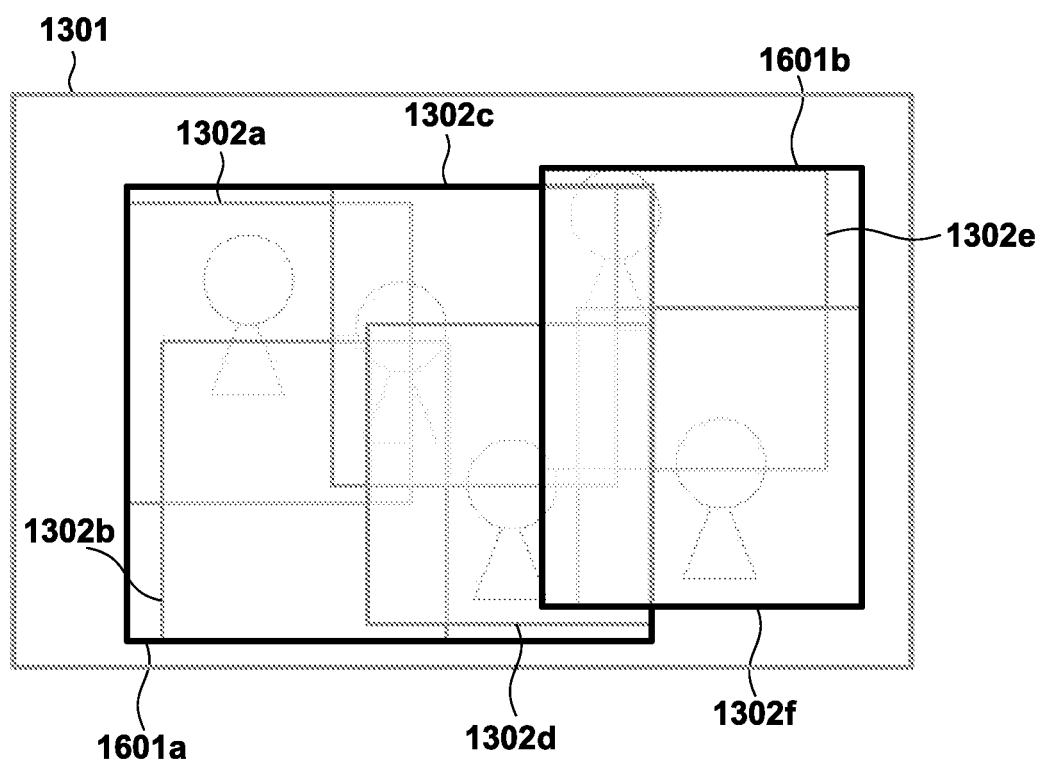
FIG. 16 is a diagram illustrating an example of an area image relating to an image data transfer command.

In the embodiment described above, the arithmetic processing unit 203 of the image capture apparatus 110 sends the area image 1303 corresponding to all of the partial areas 1302 via a single image data transfer command. However, for example, the size of the image data corresponding to all of the partial areas 1302 may be greater than the upper limit of the size (maximum size) able to be sent via a single image data transfer command, causing it to be unable to be sent. In this case, the arithmetic processing unit 203 of the image capture apparatus 110 may be configured to select the partial area/s 1302 to analyze in a manner such that the size of the area image does not exceed the maximum size able to be sent via a single image data transfer command. FIG. 16 is a diagram illustrating an example in which, in a case where the area image corresponding to six partial areas, i.e., the partial areas 1302a to 1302f, cannot be sent by the arithmetic processing unit 203 of the image capture apparatus 110 via a single image data transfer command, the partial area/s 1302 to analyze are selected. In this example, the arithmetic processing unit 203 of the image capture apparatus 110 selects four partial areas, the partial areas 1302a to 1302d. An area image 1601a corresponding to the plurality of partial areas (the partial areas 1302a to 1302d) with its configuration changed due to selection has a size that is able to be sent via a single image data transfer command.

Note that in a case where the size of the area image is greater than the maximum size described above, the arithmetic processing unit 203 may divide the plurality of partial areas into a plurality of groups in a manner such that the size of the area images does not exceed the maximum size and issue a location information transfer command for each group. For example, the arithmetic processing unit 203 of the image capture apparatus 110 make form a first group including the four partial areas of the partial areas 1302a to 1302d and a second group including the two partial areas of the partial areas 1302e and 1302f and execute analysis processing on each group. In this case, the area image 1601a corresponding to the first group and an area image 1601b corresponding to the second group are sent via separate image data transfer commands, thus eliminating the problem relating to area image size. Also, in this case, by repeating the steps S1501 to S1504 of FIG. 15 for each group, the location information of the partial areas and the area image can be sent to the detachable device. However, no such limitation is intended. For example, by adding information indicating what area image each partial area belongs to the location information, the location information of the partial areas (in this example, the partial areas 1302a to 1302f) may be sent via a single location information transfer command.

Second Modified Example

Also, in some cases, the number of partial areas may exceed the maximum number able to be sent via a single location information transfer command. In this case, the arithmetic processing unit 203 of the image capture apparatus 110 may be configured to select a partial area to be analyzed (a partial area to be sent to the detachable device 100) in a manner such that the number does not exceed the maximum number of partial areas able to be sent via a single location information transfer command. Also, as described in the first modified example, the arithmetic processing unit 203 may divide the plurality of partial areas into a plurality of groups and send these groups. In this case, naturally, the groups are formed in a manner such that the number of partial areas that belong to each group does not exceed that maximum number of partial areas able to be sent via a single location information transfer command.

Third Modified Example

Also, in some cases, when the number of the partial areas 1302 is large, for example, the size of the analysis processing result corresponding to all of the partial areas 1302 may exceed the upper limit for the data size able to be sent via a single analysis processing result transfer command. In this case, the arithmetic processing unit 203 selects the partial areas 1302 to be sent via a single analysis processing result transfer command in a manner such that the size of the analysis processing result to be sent via a single analysis processing result transfer command does not exceed the size able to be sent via a single analysis processing result transfer command. In other words, the arithmetic processing unit 203 notifies the detachable device 100 of only (the location information of) the selected partial areas, so that the size of the processing result is kept to equal to or less than the size able to be sent via a single analysis processing result transfer command. Let us take an example in which a single analysis processing result transfer command can be used to send the analysis processing results corresponding to three partial areas. In this example, the analysis processing results corresponding to six partial areas, i.e., the partial areas 1302a to 1302f, cannot be sent via a single analysis processing result transfer command. Thus, the arithmetic processing unit 203 is configured to send to the detachable device 100, as the analysis preprocessing result, the three partial areas, the partial areas 1302a to 1302c, and receive the analysis processing results with a single analysis processing result transfer command.

Note that in this case, the detachable device 100 may be configured to send the analysis processing results divided into a plurality of groups in a case where the partial areas 1302a to 1302f are sent to be analyzed. In this case, the analysis processing results are sent via an analysis processing result transfer command at number of times corresponding to the number of groups. For example, the detachable device 100 may form two groups, one group of analysis processing results corresponding to the partial areas 1302a to 1302c and another group of analysis processing results corresponding to the partial areas 1302d to 1302f. Then, all of the analysis processing results may be sent by sending the analysis processing results group by group according to analysis processing result transfer commands from the arithmetic processing unit 203.

Fourth Modified Example

Also, in some cases, the size of the data including both the area image 1303 and the location information of the partial areas 1302 and the analysis processing result corresponding to the partial areas 1302 may exceed the data size set on the basis of the storage capacity of the storage unit 404. For example, such a situation may occur in a case where the number of partial areas 1302 is large and the size of the area image is also large. In such a case, the detachable device 100 is unable to execute analysis processing. Then, the arithmetic processing unit 203 may select the partial areas 1302 for analysis processing in a manner such that the size of the data including both the area image 1303 and the location information of the partial areas 1302 and the analysis processing result corresponding to the partial areas 1302 does not exceed the data size set as described above. Take an example in which the size of the data including the location information corresponding to the six partial areas, the partial areas 1302a to 1302f, the analysis processing result, the area image, and the analysis processing result exceeds the set data size. In this example, the arithmetic processing unit 203 sends, to the detachable device 100, the location information corresponding to three of the partial areas, the partial areas 1302a to 1302c, and the area image corresponding to the partial areas. In this manner, the size of the data including the location information, the analysis processing result, the area image, and the analysis processing result is kept to equal to or less than the set data size, allowing for analysis processing to be executed.

Fifth Modified Example

Note that in selecting the plurality of partial areas in the first to third modified examples described above, the arithmetic processing unit 203 may preferentially select the partial areas 1302 that have large overlapping areas. Also, in dividing the plurality of partial areas into groups in the first to fourth modified examples described above, the groups may be formed in a manner such that the partial areas belonging to the same group have large overlapping areas. This allows the amount of image data corresponding to the partial areas 1302 sent via a single image data transfer command to be reduced, thus improving the efficiency of the communication between the image capture apparatus 110 and the detachable device 100. Accordingly, the processing efficiency of an apparatus mountable with a detachable device and the detachable device can be enhanced.

Also, in selecting the plurality of partial areas in the first to third modified examples described above, the arithmetic processing unit 203 may preferentially select a set of partial areas 1302 located above and below one another in terms of the positional relationship. Also, in dividing the plurality of partial areas in to groups in the first to fourth modified examples described above, the partial areas of the plurality of partial areas with an above/below positional relationship may be preferentially set to belong to the same group. This allows the number of times the FPGA 402 seeks the address to be reduced when accessing the image data corresponding to the partial areas 1302 to be sent via a single image data transfer command. Accordingly, the processing efficiency of an apparatus mountable with a detachable device and the detachable device can be enhanced.

Sixth Modified Example

Also, for example, in some cases, the partial areas 1302 are set on the basis of user input. In this case, the input-output device 130 may receive information that designating the partial areas 1302 (hereinafter, referred to as "area designation information"). In this example, the area designation information includes information designating the location of the partial areas 1302 (hereinafter, referred to as "location designation information") and information designating the processing to be executed on each of the partial areas 1302 (hereinafter, referred to as "processing designation information"). However, no such limitation is intended. For example, only one of the location designation information or the processing designation information may be used.

In this case, in step S805 of FIG. 8, the user inputs the location of the partial areas 1302 in the captured image 1301 as the location designation information and selects the processing to be executed on each of the partial areas 1302 from the integrated processing list to input the processing designation information.

FIG. 17 is a diagram illustrating an example of a screen display of the location designation information and the processing designation information. Via this display screen, a user interface 1701 is displayed, for example. The user interface 1701, for example, includes a captured image display area 1702, location display frames 1703*a* to 1703*c*, integrated processing list display areas 1704*a* to 1704*c*, and a post-processing list display area 1705. The user can see the captured image, the integrated processing list, and the post-processing list by checking these areas. Note that hereinafter, the location display frames 1703*a* to 1703*c* are referred as "location display frames 1703" and the integrated processing list display areas 1704*a* to 1704*c* are referred to as "integrated processing list display areas 1704".

The user may use the user interface 1701 and interact with the location display frames 1703 to input the location designation information. Also, the user may select the processing designation information from the integrated processing list displayed in the integrated processing list display areas 1704. Furthermore, the user may select the post-processing to be executed from the processing list displayed in the post-processing list display area 1705. In the example illustrated in FIG. 17, by the user, "face detection" is selected as the processing designation information for the area corresponding to the location designation information designated by the location display frame 1703*a* and the location display frame 1703*b*, "human body detection" is selected as the processing designation information for the area corresponding to the location designation information designated by the location display frame 1703*c*, and "display" and "store" are selected as the post-processing to be executed. Note that in the present embodiment, only one processing to be executed is selected. However, no such limitation is intended. In another example, the user may select a plurality of items of processing to be executed. For example, in addition to "face detection", "human body detection" and/or "vehicle detection" may be selected. Also, in a case where one item of processing is selected, other items of processing may be made unable to be selected. For example, in the integrated processing list display areas 1704 of FIG. 17, when "human body detection" is selected in a state when "face detection" is selected, the "face detection" selection may be cancelled. Also, in the example of FIG. 17, the two items of post-processing are selected. However, in another example, only one may be selected.

Then, in step S807, the input-output device 130 sends the location designation information for each of the partial areas 1302 and the processing designation information to the image capture apparatus 110.

In step S902 of FIG. 9, the control unit 304 controls the analysis unit 305 and, on the basis of the location designation information received from the input-output device 130 and the location in the captured image 1301 of the area image 1303, determine the location information in the area image 1303 of the partial areas 1302. In step S903, the control unit 304 controls the analysis unit 305 and determines whether or not the processing designation information received from the input-output device 130 is included in the second processing list for each of the partial areas 1302. The control unit 304 executes step S904 for each partial area 1302 for which the processing designation information has been determined to not be included in the second processing list. The control unit 304 executes the steps from S905 to step S907, i.e., the steps from S1501 to S1504 of FIG. 15, for each partial area 1302 for which the processing designation information has been determined to be included in the second processing list.

In this manner, information relating to a plurality of partial areas selected by the user can be sent via a single command. Thus, the efficiency of the communication between the image capture apparatus 110 and the detachable device 100 can be improved.

Seventh Modified Example

Also, in some cases, in a case where the analysis unit 501 of the detachable device 100 can execute a plurality of items of analysis processing, different items of analysis processing are executed on each of the partial areas 1302.

In this case, the analysis unit 501, for example, may include an analysis execution unit 504*a* (not illustrated) and an analysis execution unit 504*b* (not illustrated), depending on the analysis processing to be executed. Note that in the present example, the analysis units are able to execute two types of analysis processing. However, no such limitation is intended, and three or more types of analysis may be executable. Also, the analysis preprocessing result may be location information of the plurality of partial areas obtained from the captured image via analysis preprocessing, processing information indicating the type of image analysis processing to be executed on each of the partial areas, or an area image. In the present example, the processing information is set on the basis of the size of the moving body detected via analysis preprocessing on the captured image 1301 by the arithmetic processing unit 203. However, no such limitation is intended. The processing information, for example, may be set on the basis of the processing designation information received by the input-output device 130. Also, the location information transfer command may transfer the processing information as well as the location information.

In this case, in step S1501, the arithmetic processing unit 203 of the image capture apparatus 110 issues a location information transfer command compliant with SD standards to the detachable device 100 and sends location information and processing information of all of the partial areas 1302. Here, because the number of times the FPGA 402 seeks the address when accessing the image data corresponding to the partial areas 1302 can be reduced, the partial areas 1302 may be sent in an order rearranged according to the processing information. In step S1502, the FPGA 402 stores the sent location information and processing information of all of the partial areas 1302 in the storage unit 404. In step S1505, the FPGA 402 reads out, from the storage unit 404, the location information and the processing information of one of the partial areas 1302 on which analysis processing has not yet been executed. Furthermore, the FPGA 402 reads out, from the storage unit 404, the image of the area corresponding to the read location information of the area image 1303 and selects the analysis execution unit 504a or the analysis execution unit 504b that corresponds to the read processing information. In step S1505, the FPGA 402 executes analysis processing via the selected analysis execution unit 504a or the analysis execution unit 504b on the read image to obtain the analysis processing results 1401 for the partial areas 1302.

In this example, as described above, the image capture apparatus 110 sends the location information and the processing information of the plurality of partial areas 1302 to the detachable device 100 via a location information transfer command and sends the area image 1303 corresponding to the plurality of partial areas 1302 via an image data transfer command. In this manner, information relating to a plurality of partial areas can be sent via a single command. Thus, the efficiency of the communication between the image capture apparatus 110 and the detachable device 100 can be improved.

As described above, according to the embodiments, the number of times a command is issued when the data for analysis is divided into a plurality of pieces of subdata and provided for analysis processing to the detachable device can be reduced. Specifically, an information processing apparatus mounted with a detachable device sends to the device actual data including a plurality of pieces of subdata and obtaining information for obtaining the plurality of pieces of subdata from the actual data via separate commands. Here, by sending the obtaining information corresponding the subdata of a predetermined number of two or more via issuing a command at once, the number of times a command is issued is reduced, compared to a case where the plurality of pieces of subdata is sent to a device separately. In the embodiments described above, the data for analysis processing is the captured image, the plurality of pieces of subdata on which analysis processing is to be executed is the plurality of partial areas, and the actual data including the plurality of pieces of subdata is the area image. Also, obtaining information for obtaining the plurality of pieces of subdata on which analysis processing is to be executed from the actual data is the location information. However, the data for analysis processing is not limited to being an image. For example, the data for analysis may be audio. In this case, a plurality of partial audio extracted from audio for analysis is used as the plurality of pieces of subdata on which analysis processing is to be executed. Also, the actual data to be sent to the device is audio data of a range including the plurality of partial audio, and the obtaining information is information indicating the range of the partial audio cut out from the audio data.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2020-143838, filed Aug. 27, 2020, and No. 2021-073658, filed Apr. 23, 2021 which are hereby incorporated by reference herein in their entirety.

What is claimed is:

1. An information processing apparatus, comprising:
a mounting mechanism for detachably mounting a device with an analysis processing executing function;
one or more processors; and
one or more memories storing executable instructions which, when executed by the processor, cause the information processing apparatus to perform operations including:
sending, to the device, data for analysis including a plurality of pieces of subdata for analysis processing via a first command and location information indicating a location of each of the plurality of pieces of subdata in the data for analysis via a second command which is different from the first command; and
obtaining, from the device, a plurality of results obtained by the device executing the analysis processing on the plurality of pieces of subdata.

2. The apparatus according to claim 1, wherein
the data for analysis is a captured image;
the analysis processing is image analysis processing; and
the plurality of pieces of subdata are a plurality of partial areas of the captured image.

3. The apparatus according to claim 2, wherein the information processing apparatus performs further operations including:
setting, for the data for analysis, set a type of the image analysis processing to be executed on each of the plurality of partial areas, wherein
a result of image analysis processing executable by the device from among the image analysis processing is obtained.

4. The apparatus according to claim 2, wherein
the location information includes coordinates indicating a location in the captured image of each of the plurality of partial areas.

5. The apparatus according to claim 2, wherein
the location information includes information indicating a size of each of the plurality of partial areas.
6. The apparatus according to claim 2, wherein
a size of the subdata is less than a size of the captured image.
7. The apparatus according to claim 2, wherein
in a case where a size of the subdata exceeds a maximum size able to be sent via the first command at once, what partial areas constitute the plurality of partial areas are changed in a manner such that a size of the subdata does not exceed the maximum size.
8. The apparatus according to claim 2, wherein
in a case where a size of the subdata exceeds a maximum size able to be sent via the first command at once, the plurality of partial areas are divided into a plurality of groups and each group is sent via the first command and the second command in a manner such that a size of subdata does not exceed the maximum size.
9. The apparatus according to claim 2, wherein
in a case where a number of partial areas in the plurality of partial areas exceeds a maximum number able to be sent via the second command at once, what partial areas constitute the plurality of partial areas are changed in a manner such that a number of partial areas does not exceed the maximum number.
10. The apparatus according to claim 2, wherein
in a case where a number of partial areas in the plurality of partial areas exceeds a maximum number able to be sent via the second command at once, the plurality of partial areas are divided into a plurality of groups and each group is sent via the second command in a manner such that a number of partial areas does not exceed the maximum number.
11. The apparatus according to claim 2, wherein
the plurality of results are obtained from the device using a third command via which results of a predetermined number of two or more can be received at once.
12. The apparatus according to claim 11, wherein
in a case where a data size of the plurality of results exceeds a size able to be sent at once via the third command, what partial areas constitute the plurality of partial areas are changed in a manner such that a data size of the plurality of results does not exceed the size able to be sent.
13. The apparatus according to claim 11, wherein
what partial areas constitute the plurality of partial areas are changed in a manner such that a total data size of the location information, the plurality of pieces of subdata, and the plurality of results does not exceed a data size set on the basis of a storage capacity of the device.
14. The apparatus according to claim 7, wherein
what partial areas constitute the plurality of partial areas are selected in a manner such that partial areas have large overlapping areas.
15. The apparatus according to claim 8, wherein
the plurality of partial areas are divided into the plurality of groups in a manner such that partial areas belonging to the same group have large overlapping areas.
16. The apparatus according to claim 7, wherein
what partial areas constitute the plurality of partial areas are selected in a manner such that partial areas with an above/below positional relationship are preferentially included.
17. The apparatus according to claim 8, wherein
the sending unit preferentially puts partial areas with an above/below positional relationship from among the plurality of partial areas into the same group.
18. The apparatus according to claim 2, wherein the information processing apparatus performs further operations including:
receiving a plurality of pieces of location designation information that designate an area on which the image analysis processing is to be executed, wherein
the location information of each of the plurality of partial areas is determined on the basis of the plurality of pieces of location designation information.
19. The apparatus according to claim 18, wherein
the plurality of pieces of processing designation information that designate the image analysis processing to be executed on each of the plurality of partial areas are received; and
the partial areas corresponding to the plurality of pieces of processing designation information included in the image analysis processing executable by the device are selected.
20. The apparatus according to claim 19, wherein
the location designation information and the processing designation information are received; and
the location information of each of the plurality of partial areas is determined on the basis of the plurality of pieces of location designation information, and processing information indicating image analysis processing to be executed on each of the plurality of partial areas is determined on the basis of the processing designation information.
21. The apparatus according to claim 20, wherein
the plurality of partial areas are sent in an order according to the processing information.
22. The apparatus according to claim 1, wherein
the mounting mechanism includes an SD card slot; and
the device is an SD card-like device.
23. The apparatus according to claim 1, wherein the data for analysis is audio;
the plurality of pieces of subdata are a plurality of partial audio of the audio; and
the location information is information indicating a location in the audio of the plurality of partial audio.
24. A device detachably mountable in an information processing apparatus, comprising:
a processing circuit and
a memory storing executable instructions which, when executed by the processing circuit, cause the device to perform operations including:
executing analysis processing on a designated piece of subdata from among data for analysis;
receiving data for analysis including a plurality of pieces of subdata, on which the analysis processing is to be executed, according to a first command from the information processing apparatus while the device is mounted in the information processing apparatus; and
receiving, from the information processing apparatus, location information indicating a location of each of the plurality of pieces of subdata in the data for analysis according to a second command from the information processing apparatus, wherein the second command is different from the first command.
25. A control method for an information processing apparatus provided with a mounting mechanism for detachably mounting a device with an analysis processing executing function, the method comprising:

sending, to the device, data for analysis including a plurality of pieces of subdata for analysis processing via a first command and location information indicating a location of each of the plurality of pieces of subdata in the data for analysis via a second command which is different from the first command; and obtaining, from the device, a plurality of results obtained by the device executing the analysis processing on the plurality of pieces of subdata.

26. A control method for a device detachably mountable in an information processing apparatus, the method comprising:

executing analysis processing on a designated piece of subdata from among data for analysis;

receiving data for analysis including a plurality of pieces of subdata, on which the analysis processing is to be executed, according to a first command from the information processing apparatus while the device is mounted in the information processing apparatus; and receiving, from the information processing apparatus, location information indicating a location of each of the plurality of pieces of subdata in the data for analysis according to a second command from the information processing apparatus, wherein the second command is different from the first command.

27. A non-transitory computer-readable storage medium storing a program for causing a computer to execute a control method for an information processing apparatus provided with a mounting mechanism for detachably mounting a device with an analysis processing executing function, the method comprising:

sending, to the device, data for analysis including a plurality of pieces of subdata for analysis processing via a first command and location information indicating a location of each of the plurality of pieces of subdata in the data for analysis via a second command which is different from the first command; and obtaining, from the device, a plurality of results obtained by the device executing the analysis processing on the plurality of pieces of subdata.

* * * * *